United States Patent
Redlich et al.

(10) Patent No.: US 12,341,721 B2
(45) Date of Patent: Jun. 24, 2025

(54) RESOURCE ALLOCATION SIGNALNG IN A WIRELESS LOCAL AREA NETWORK PREAMBLE

(71) Applicant: HUAWEI TECHNOLOGIES CO., LTD., Shenzhen (CN)

(72) Inventors: Oded Redlich, Hod Hasharon (IL); Genadiy Tsodik, Hod Hasharon (IL); Shimon Shilo, Hod Hasharon (IL); Mengshi Hu, Shenzhen (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 17/860,735

(22) Filed: Jul. 8, 2022

(65) Prior Publication Data
US 2022/0345276 A1    Oct. 27, 2022

Related U.S. Application Data

(63) Continuation of application No. PCT/EP2020/050607, filed on Jan. 10, 2020.

(51) Int. Cl.
*H04L 5/00*    (2006.01)
*H04W 72/23*    (2023.01)
*H04W 84/12*    (2009.01)

(52) U.S. Cl.
CPC .......... *H04L 5/0053* (2013.01); *H04W 72/23* (2023.01); *H04W 84/12* (2013.01)

(58) Field of Classification Search
CPC ............. H04L 5/0053; H04L 27/2602; H04W 72/0453; H04W 72/23; H04W 72/231; H04W 72/232; H04W 84/12
See application file for complete search history.

(56) References Cited

U.S. PATENT DOCUMENTS

| 2016/0330300 A1 | 11/2016 | Josiam et al. |
| 2017/0064718 A1 | 3/2017 | Bharadwaj et al. |

(Continued)

FOREIGN PATENT DOCUMENTS

| JP | 2019202783 A | 11/2019 |
| JP | 2021077981 A | 5/2021 |

(Continued)

OTHER PUBLICATIONS

Lei Huang (Panasonic), Signaling support for multi-RU assignment, IEEE 802.11-19/1868r2, Internet URL: https://mentor.ieee.org/802.11/dcn/19/11-19-1868-02-00be-signaling-support-for-multi-ru-assignment.pptx>, Jan. 7, 2020, 13 pages.

(Continued)

*Primary Examiner* — Pao Sinkantarakorn
(74) *Attorney, Agent, or Firm* — HAUPTMAN HAM, LLP

(57) ABSTRACT

An apparatus for wireless communication. A memory stores instructions; and a processor coupled with the memory, wherein the processor executes the instructions in memory to cause the processor to: generate a signaling field, SIG, in a wireless local area network, WLAN, wherein the SIG includes a resource unit, RU, allocation field, indicating a size and location of an RU in a frequency resource, the SIG further including one or more user fields, a user field including information of a scheduled station, STA; wherein an MRU which includes multiple RUs is assigned to one STA; and transmit the SIG.

18 Claims, 22 Drawing Sheets

(56) References Cited

U.S. PATENT DOCUMENTS

| | | | |
|---|---|---|---|
| 2019/0238288 A1 | 8/2019 | Liu et al. | |
| 2019/0260531 A1 | 8/2019 | Chen et al. | |
| 2019/0312710 A1 | 10/2019 | Noh et al. | |
| 2019/0380117 A1 | 12/2019 | Verma et al. | |
| 2020/0305024 A1* | 9/2020 | Chen | H04W 72/0453 |
| 2021/0160889 A1* | 5/2021 | Yang | H04L 27/261 |
| 2022/0295468 A1* | 9/2022 | Huang | H04W 72/0453 |
| 2022/0345276 A1 | 10/2022 | Redlich et al. | |
| 2022/0353847 A1* | 11/2022 | Kim | H04W 72/0453 |

FOREIGN PATENT DOCUMENTS

| | | | |
|---|---|---|---|
| JP | 7447280 B2 | 3/2024 | |
| WO | 2021139900 A1 | 7/2021 | |

OTHER PUBLICATIONS

Prior Art Document(s) Myeongjin Kim (Samsung), Multiple RU Support for 11be, IEEE 802.11-19/2161r1, Internet URL:https://mentor.ieee.org/802.11/dcn/19/11-19-2161-01-00bemultiple-ru-support-for-11be.pptx>, Jan. 9, 2020, 13 pages.

Oded Redlich (Huawei), Discussion on Multi-RU in 802.11be, IEEE 802.11-20/0128r0, Internet URL: https://mentor.ieee.org/802.11/dcn/20/11-20-0128-00-00be-discussion-on-multi-ru-in-802-11be.pptx>, Jan. 13, 2020, (Document of the same applicant, which has been disclosed after the filing date of the present application), 30 pages.

European Office Action issued in corresponding European Application No. 20700980.4, dated Sep. 29, 2023, pp. 1-5.

Japanese Office Action issued in corresponding Japanese Application No. 2022-542308, dated Aug. 22, 2023, pp. 1-7.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

International Search Report issued in corresponding International Application No. PCT/EP2020/050607, dated Aug. 3, 2020, pp. 1-12.

Canadian Office Action issued in corresponding Canadian Application No. 3,164,330, dated Aug. 8, 2024, pp. 1-4.

Chinese Office Action issued in corresponding Chinese Application No. 202311101914.2, dated Mar. 15, 2024, pp. 1-10.

* cited by examiner

CC1-common = 11000000 01110010 11000000 11000000

CC2-common = 11000000 11001000 11000000 11000000

CC1 user-specific field

| UF1 | UF5 | UF7 |
|---|---|---|
| STA1_ID<br>11ax user-field<br>sub-fields | STA1_ID<br>bitmap=<br>10110000 | Other STA |

CC2 user-specific field

| UF2 | UF4 | UF6 | UF8 |
|---|---|---|---|
| Other STA | STA1_ID<br>bitmap=<br>10111000 | STA2_ID<br>11ax user-field<br>sub-fields | STA2_ID<br>bitmap=<br>0101xxxx |

FIG. 7

CC1-common = 11000000 11001000 11000000 11000000
CC2-common = 11000000 11001000 11000000 11000000

CC1 user-specific field

| UF1 | UF3 | UF5 | UF7 |
|---|---|---|---|
| STA1_ID  11ax user-field sub-fields | STA1_ID  bitmap= 101110000 | STA3_ID  bitmap= 101110000 | Other STA |

CC2 user-specific field

| UF2 | UF4 | UF6 | UF8 |
|---|---|---|---|
| Other STA | STA3_ID | STA2_ID  11ax user-field sub-fields | STA2_ID  bitmap= 0101xxxx |

FIG. 8

| RU Allocation Subfield | N_MRU_1 | N_MRU_2 | CRC & Tail |
|---|---|---|---|
| bits: 8, 9, or 10 | 2 | 2 | 10 |

FIG. 9a

CC1
| RU Allocation Subfield (RA) 1 | First N_MRU_1 | N_MRU_2 | CRC & Tail |
|---|---|---|---|

CC2
| RU Allocation Subfield (RA) 2 | Second N_MRU_1 | N_MRU_2 | CRC & Tail |
|---|---|---|---| bits: 8, 9, or 10    2    2    10

FIG. 9b

CC1
| RA 1 | First N_MRU_1 | RA 3 | Third N_MRU_1 | N_MRU_2 | CRC & Tail |
|---|---|---|---|---|---|

CC2
| RA 2 | 2nd N_MRU_1 | RA 4 | 4th N_MRU_1 | N_MRU_2 | CRC & Tail |
|---|---|---|---|---|---| bits: 8, 9, or 10    2    8, 9, or 10    2    2    10

FIG. 9c

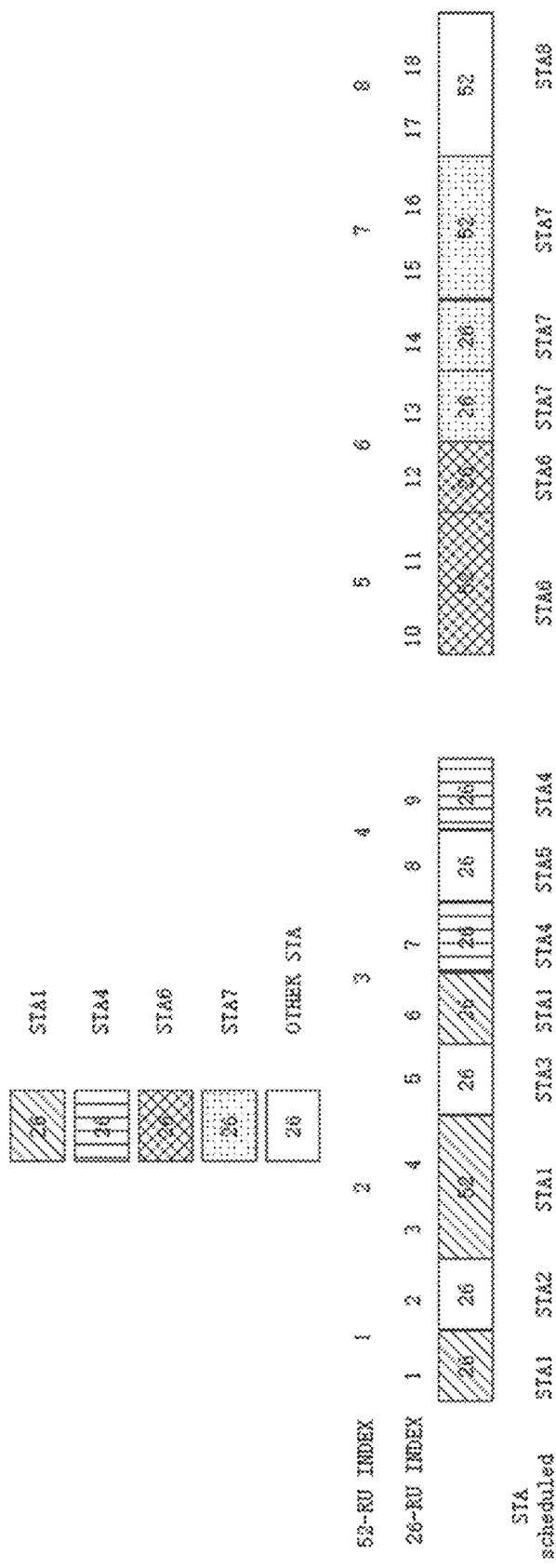

RESOURCE ALLOCATION SIGNALNG IN A WIRELESS LOCAL AREA NETWORK PREAMBLE

CROSS-REFERENCE TO RELATED APPLICATIONS

This application is a continuation of International Application No. PCT/EP2020/050607, filed on Jan. 10, 2020, the disclosure of which is hereby incorporated by reference in its entirety.

BACKGROUND

In the IEEE 802.11ax standard, OFDMA modulation was first introduced. The description of which RUs are used for a given PPDU is given in its SIG-B field (and defined in detail in the 802.11ax standard, illustrated in FIG. 1). This field includes 2 main sub-field: the common field and the user specific field as depicted in the 802.11ax standard.

The 802.11ax standard limits non-AP STAs to use of a single resource unit (RU) that includes contiguous tones (sub-carriers). Although there are various RU sizes defined in the standard (e.g., 26, 52, 106, 242, 484, 996 tones), restricting the allocation to a single RU limits the usage of the channel resource.

As mentioned above, in the current 802.11ax standard (i.e., the prior art) there are 6 sizes of RUs. In the allocation process, the scheduler allocates a single RU to a given STA in a MU-PPDU (Multi-User Phy Protocol Data Unit—the transmitted packet) or SU-PPDU (Single-User PPDU) transmission.

In response to there being an unallocated RU, the unallocated RU is not assigned to a STA that has already been given a RU.

SUMMARY

At least one embodiments described herein is contemplated to expand and improve the method of utilizing the channel resources in WLAN.

Methods, apparatuses, and computer readable media for resource allocation signaling in an extremely high throughput wireless local area network (WLAN) are disclosed.

Apparatus such as an access point (AP) generates a signaling field, SIG. The SIG includes a resource unit (RU) allocation field, indicating a size and location of an RU in a frequency resource. The SIG further includes one or more user fields, a user field includes information of a scheduled station, STA; wherein an MRU which includes multiple RUs (MRU) is allowed to be assigned to one or more STAs (same). The RU includes a RU defined in 802.11ax. The MRU is a small MRU which includes combination of 26-RU, 52-RU, or 106-RU in a 20 MHz frequency segment; or a large MRU which includes combination of 242-RU, 484-RU, or 996-RU in the transmission bandwidth.

In some examples, the MRU includes a first RU and a second RU. The apparatus generates a first user field corresponding to the first RU and a second user field corresponding to the second RU. The first user field and the second user field include the same ID of the STA. The second user field further includes one or any combination of the following: the number of RUs assigned to the STA; or the size and location of RUs in the MRU assigned to the STA.

Alternatively, the apparatus generates a common field of the SIG including information for small MRU allocated in a corresponding 20 MHz frequency segment; and/or information for a number of the large MRU allocated in the bandwidth of the transmission.

Alternatively, the apparatus generates a Single-RU user field and an MRU user field. The Single-RU user field corresponds to a RU, which is not an MRU. The MRU user field corresponds to an MRU, including at least the following: a STA_ID, a RU bitmap indicating size and location of an RU included in the MRU.

Alternatively, the apparatus generates a Common-MRU field indicating which 26-RUs are included in an MRU in a corresponding 20 MHz frequency segment; and/or a Common-MRU field indicating which 242-RUs are included in an MRU in a bandwidth of the transmission.

Alternatively, the apparatus generates one or more common-MRU fields, a common-MRU field indicating whether an actual allocated RU is in an MRU (which actual allocated RUs are in an MRU).

Further, other information such as channel puncturing information in a U-SIG is for indicating the MRU allocation. The puncturing information indicates a non-contiguous large RU and one or more user fields corresponding to the non-contiguous large RU, wherein the one or more user fields includes a different station's information.

One or more stations (e.g., wireless or mobile devices) receives the WLAN preamble, including the SIG. The one or more stations then determine an MRU which includes multiple RUs assigned to the STA based on the SIG. The stations then determine an MRU assigned to the STA by:

a first user field corresponding to the first RU and a second user field corresponding to the second RU; the first user field and the second user field including a same ID of the STA; the second user field further includes one or any combination of the following: the number of RUs assigned to the STA; or, the size and location of an RU in the MRU assigned to the STA; or a common field of the SIG including information for small MRU allocated in a corresponding 20 MHz frequency segment; and/or information for a number of the large MRU allocated in the bandwidth of the transmission, or a Single-RU user field and an MRU user field; the Single-RU user field corresponds to a RU which is not an MRU; the MRU user field corresponds to an MRU, including at least the following: a STA_ID and a RU bitmap indicating size and location of an RU in the MRU; or a Common-MRU field indicating which 26-RUs are included in an MRU in a corresponding 20 MHz frequency segment; and/or a Common-MRU field indicating which 242-RUs are included in an MRU in a bandwidth of the transmission; or one or more common-MRU fields, a common-MRU field indicating whether an actual allocated RU is in an MRU (which actual allocated RUs are in an MRU); or other information such as puncturing information indicating a non-contiguous large RU and one or more user fields corresponding to the non-contiguous large RU, the one or more user fields includes a different station's information.

The above mentioned fields in the SIG is load-balanced in two or more channel content. The mapping between the MRU (or existing RU) and the STA are indicated by the structure of the fields and the location of the fields in the SIG.

Methods executed by the apparatus, including the AP and the stations are also provided, computer readable media for resource allocation signaling are also provided.

Some examples of the methods, apparatuses, or non-transitory computer-readable media described herein further includes processes, features, means, or instructions for resource allocation signaling in an extremely high throughput WLAN preamble. Further scope of the applicability of the described systems, methods, apparatuses, or computer-read able media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

The above and other objects and features of the embodiments described herein will become apparent from the following description given in conjunction with the accompanying drawings, in which:

FIG. 7 is a diagram illustrating another example of indication structure according to at least one embodiment;

FIG. 8 is a diagram illustrating another example of indication structure according to at least one embodiment;

FIG. 9a, 9b, 9c are diagrams illustrating examples of the common field of the EHT-SIG according to at least one embodiment;

FIG. 10a is a diagram illustrating an example of resource allocation and the station scheduled on the RU(s) according to at least one embodiment;

FIG. 10b is a diagram illustrating an example of a structure of a common field of the EHT-SIG which indicates the resource allocation of FIG. 10 aaccording to at least one embodiment;

DETAILED DESCRIPTION

Hereinafter, a method of utilizing the channel resources in 802.11be by allowing STAs to use multiple and non-contiguous portions of the channel according to at least one embodiment will be explained with reference to the accompanying drawings.

Figure 2:
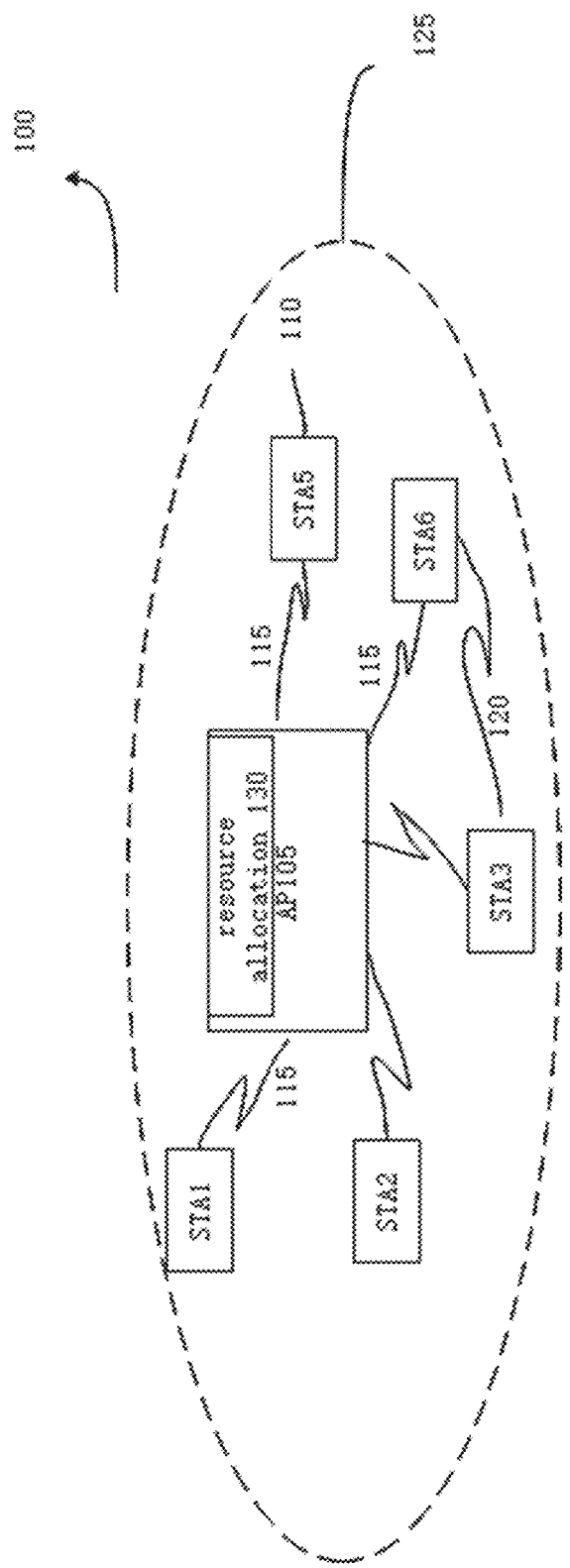
FIG. 2 is a diagram showing the example of a wireless local area network according to at least one embodiment.

For ease of understanding, terms that possibly appear in the following embodiments are explained as follows:

AP access point
AT access terminal
BSS basic service set
BW bandwidth
CC content channel
DL downlink
DS distribution system
EHT extremely high throughput
ESS extended service set
HE high efficiency
LLC logical link control
L-LTF Non-HT Long Training field
L-SIG Non-HT SIGNAL field
L-STF Non-HT Short Training field
LTF long training field
MAC medium access protocol
MCS modulation and coding scheme
MLD multi-link device
MRU multiple resource units
MS mobile station
MU multi-user
MU-MIMO multi-user multiple input, multiple output
NDP null data PPDU
OFDM orthogonal frequency division multiplexing
OFDMA orthogonal frequency division multiple access
PHY physical layer
PPDU PHY protocol data unit
RA RU allocation field
RL-SIG Repeated Non-HT SIGNAL field
RU resource unit
SAP service access point
SS subscriber station
STA station
SU single user
TDLS tunneled direct link setup
TID traffic identifier
TXOP transmission opportunity UE user equipment
UL Uplink
U-SIG Universal SIGNAL field
WM wireless medium FIG. 2 illustrates an example of a wireless local area network (WLAN) 100 that supports resource allocation signaling or scheduling signaling in an WLAN preamble (e.g., a EHT WLAN preamble) according to at least one embodiment.

The WLAN 100 includes an access point (AP) 105 and stations (STAs) 110 labeled as STA 1 through STA 6. The STAs 110 represents devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. While one AP 105 is illustrated, the WLAN 100 has multiple APs 105. STAs 110, are also referred to as a mobile station (MS), mobile device, access terminals (ATs), user equipment (UE), subscriber station (SS), or subscriber units. The STAs 110 associate and communicate with the AP 105 via a communication link 115. An AP 105 has a coverage area 125 such that STAs 110 within that area are within range of the AP 105. The STAS 110 are dispersed throughout the coverage area 125. A STA 110 is stationary, mobile, or a combination thereof. Devices in WLAN 100 communicate over unlicensed spectrum, which is a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum also includes other frequency bands. One or more of the STAs 110 and/or APs 105 include a resource allocation signaling component 130, which enables the STAs 110 and/or the APs 105 to signal resource allocations in a WLAN preamble, for example as further discussed below with reference to FIGS.

Although not shown in FIG. 2, a STA 110 is covered by more than one AP 105 and therefore associates with multiple APs 105 at different times. A single AP 105 and an associated set of STAs 110 are referred to as a basic service set (BSS). An extended service set (ESS) is a set of connected BSSs. A distribution system (DS) is used to connect APs 105 in an extended service set. A coverage area 125 for an AP 105 is divided into sectors making up a portion of the coverage area. The WLAN 100 includes APs 105 of different types (e.g., metropolitan area, home network, etc.), with varying sizes of coverage areas and overlapping coverage areas for different technologies. Although not shown, other devices communicate with the AP 105.

While the STAs 110 are capable of communicating through the AP 105 using communication links 115, STAs 110 also communicate directly via direct wireless communication links 120. Direct wireless communication links occur between STAS 110 regardless of whether any of the STAs are connected to an AP 105. Examples of direct wireless communication links 120 include Wi-Fi Direct connections, connections established by using a Wi-Fi Tunneled Direct Link Setup (TDLS) link, and other peer-to-peer (P2P) group connections.

Figure 1:
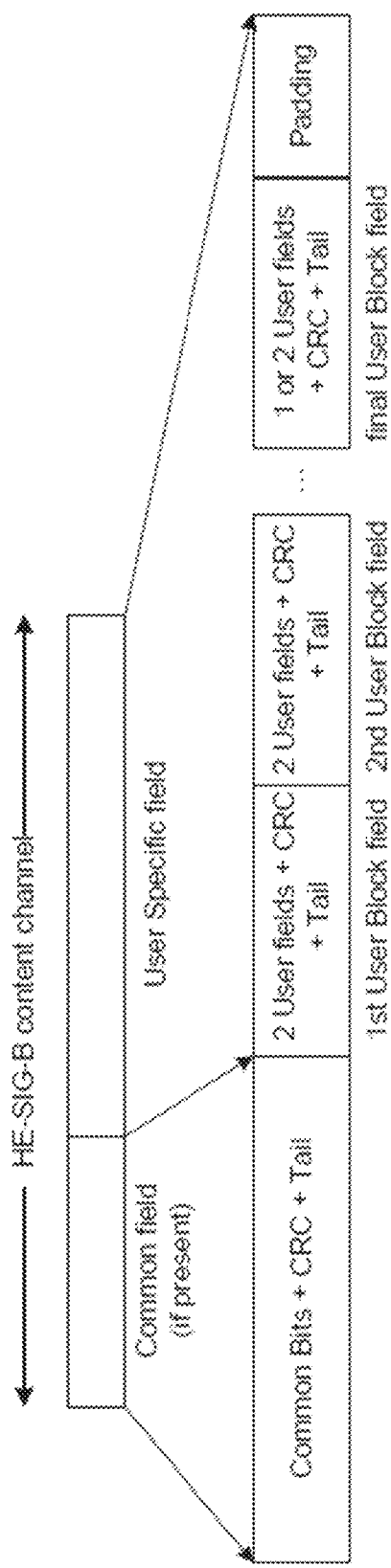
FIG. 1 is a diagram illustrating SIG-B field (and defined in detail in the 802.11ax standard.

The STAs 110 and APs 105 shown in FIG. 1 communicate according to the WLAN radio and baseband protocol including physical (PHY) and medium access control (MAC) layers from IEEE 802.11, and its various versions including, but not limited to, 802.11b, 802.11 g, 802.11a, 802.11n, 802.11ac, 802.11ad, 802.11ah, 802.11Z, 802.11ax, etc.

Transmissions to/from STAs 110 and APs 105 oftentimes include UL (uplink) or DL (downlink) transmission. In downlink transmission, control information within a header that is transmitted prior to data transmissions. The information provided in a header is used by a device to decode the subsequent data. Extremely high throughput WLAN preambles is used to schedule multiple devices, such as STAs 110, for single-user simultaneous transmission (e.g., single-user orthogonal frequency division multiple access (SU OFDMA)) and/or MU-MIMO transmissions. In one example, an EHT WLAN signaling field is used to signal a resource allocation pattern to multiple receiving STAs 110. The EHT WLAN signaling field includes a common field that is decodable by multiple STAs 110, the common field including a resource allocation field. The resource allocation field indicates resource unit distributions to the multiple STAs 110 and indicates which resource units in a resource unit distribution correspond to MU-MIMO transmissions and which resource units correspond to OFDMA single-user transmissions. The EHT WLAN signaling field also includes, subsequent to the common field, dedicated user fields that are assigned to a certain STA 110. The order in which the dedicated user fields are generated corresponds to the allocated resource units (e.g., the first dedicated user field corresponds to the first allocated resource unit). The EHT WLAN signaling field is transmitted with a WLAN preamble to the multiple STAs 110.

In at least one embodiment, some of the features or solutions are used in a trigger which triggers an uplink transmission.

Figure 3:
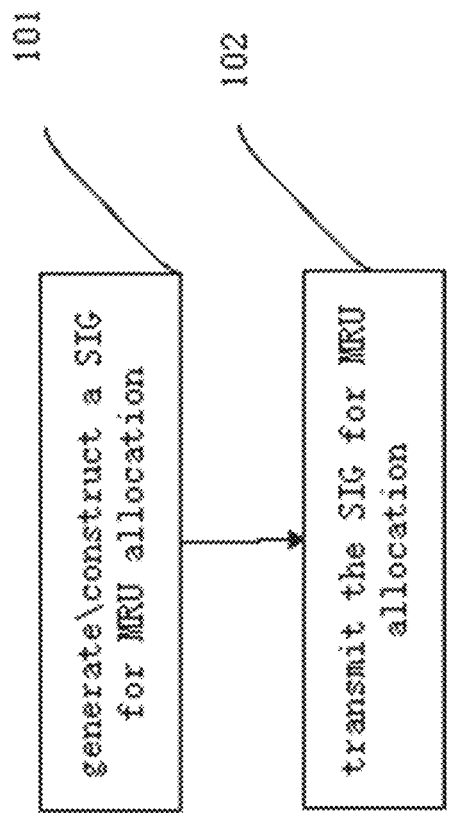
FIG. 3 is a flowchart illustrating how communicating scheduling information in WLAN on a transmitting side according to at least one embodiment.

At least one embodiment including a method of communicating scheduling information in WLAN is illustrated in FIG. 3:

101. Generating an SIG (such as an EHT-SIG) including indication information or scheduling information, by an apparatus such as an access point. The generate is replaced by construct, obtain or determine.

102. Transmit the SIG, by the apparatus.

Figure 4:
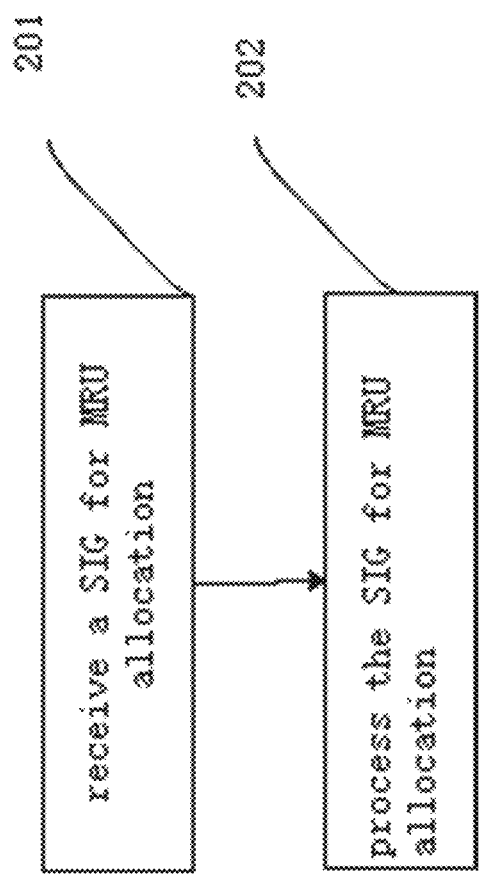
FIG. 4 is a flowchart illustrating how communicating scheduling information in WLAN on a receiving side according to at least one embodiment.

Accordingly, in at least one embodiment, a method on a non-AP station receiving scheduling information in WLAN is illustrated in FIG. 4.

201. Receiving an PPDU, in which an SIG (such as EHT-SIG) is included. The SIG is in the structure discussed in the following embodiments. A PPDU includes L-STF, L-LTF, L-SIG, RL-SIG, a U-SIG and an EHT-SIG.

There is a 2 OFDM symbol long, jointly encoded U-SIG in the EHT preamble immediately after the RL-SIG. The U-SIG contains version independent fields. The intent of the version independent content is to achieve better coexistence among future 802.11 generations. In addition, the U-SIG has some version dependent fields. The U-SIG is sent using 52 data tones and 4 pilot tones per 20 MHz. There is a variable modulation and coding scheme (MCS) and variable length EHT-SIG, immediately after the U-SIG, in an EHT PPDU sent to multiple users.

202. Process the SIG. Specifically, obtaining scheduling information based on the SIG.

The EHT-SIG is a field's name to differentiate from other SIG-Bs, such as VHT-SIG-B, HE-SIG-B. The EHT-SIG is renamed in other ways; that is, the name itself does not matter, but the content and structures discussed and described in the following embodiments provides the solution of efficiently scheduling the resources and stations.

First, in the embodiments, by the EHT-SIG, a resource unit (RU) allocation field indicates at least a sequence of RUs (size and location of an RU) in a frequency domain, and indicates information used to compute the number of users allocated to an RU. The EHT-SIG further includes one or more user fields, a user field includes information of a scheduled station, STA; wherein multiple contiguous or non-contiguous RUs defined in 802.11ax (is called MRU, or MRU) are allowed to be assigned to one or more STAs. "MRU" used in this document usually points to the RU which is a combination of the multiple contiguous or non-contiguous RUs defined e.g., in 802.11ax. They is taken as a RU(s) newly defined in the next generation of 802.11ax, for example, 802.11be.

Compared with 802.11ax, an RU Allocation subfield in an EHT-SIG content channel corresponding to a 20 MHz frequency segment indicates the RU assignment, including the size of the RU(s) and their placement in the frequency domain, and one or more combinations of multiple RUs, to be used in the EHT modulated fields of the EHT MU PPDU in the frequency domain, and indicates information used to compute the number of users allocated to an RU (non-MRU) and a combination of multiple RUs (MRU). In at least one embodiment, the subcarrier indices of the RU(s) meet the conditions in a Table which is defined in an 802.11be standard (RUs associated with an RU Allocation subfield for an EHT SIG content channel and PPDU bandwidth).

One or multiple STAs is allocated to the same MRU or 802.11ax RU (non-MRU) in a MU-MIMO format. This means that part of the RA subfield content will define the number of STAs, similarly to 802.11ax definitions: 11000y2y1y0, 11001y2y1y0 and 11010y2y1y0 for 242-RU, 484-RU and 996-RU respectively. However, in 802.11be, the maximum of 16 STAs per RU is supported, therefore the embodiments includes a RU allocation field (RA) with a value of more than 8 bits, for example, 9 bits or 10 bits to support the indication of the number of the stations.

For example: 11000y3y2y1y0, indicating a 242-RU, on which the number of stations on the 242-RU is indicated by y3y2y1y0, which equals y3y2y1y0+1;
 11001y2y1y0 indicating a 484-RU, on which the number of stations on the 484-RU is indicated by y3y2y1y0, which equals y3y2y1y0+1;
 11010 y3 y2y1y0, indicating a 996-RU, on which the number of stations on the 996-RU is indicated by y3y2y1y0, which equals y3y2y1y0+1.

The embodiments in the following have omitted the difference of the RA between the 802.11ax to make the solutions of the embodiment or examples concise. That is, value(s) of the RA(s) used in the following embodiment/examples are replaced by a new value which are corresponding to 802.11be. In some embodiments, the number of RUs that is combined as an MRU is limited. An MRU represents a size of a multiple subcarriers and the location of the multiple subcarriers in the bandwidth, which overlaps multiple 802.11ax defined RU.

Based the defined RUs in 802.11ax, for example small RU: 26, 52, or 106, some examples of MRU (combinations) includes: an MRU including {52, 26}, or {106, 26} within a 20 MHz, a 40 MHz or an 80 MHz band. In some examples, the combinations of contiguous small-size RUs are introduced, in some examples, a non-contiguous configuration is also allowed. For large RUs: 242, 484, or 996, some MRU (combinations) include:
1. 242+484 (contiguous and non-contiguous, within an 80 MHz segment);
2. 242+242 (Punctured case, non-contiguous);
3. 484+996;
4. 242+484+242+484;
5. 242+484+996;
6. 242+242+996, etc.

Further, based on some predefined MRU (i.e., defined combination of RUs of 802.11ax, is also referred to as an MRU), an important issue is to provide an efficient indication solution to indicate the allocation of the MRU and the corresponding information of the station scheduled on the MRU. With other words, the problem is how to indicate the allocation and station information which allows multiple RUs allocated to one station, and accordingly how the station obtains whether the station is scheduled and on which RU or MRU the station is allocated, so as that the station communicates on the allocated RU or MRU accordingly.

Still further, the RUs assignment is decided by the AP according to various criteria. For example, the AP decides to use the RUs with the highest SNR for a specific user and these RUs are not necessarily contiguous. Further, RUs in a transmission contain the same data packet for a station, and RUs in the MRU and together with other RUs in the PPDU are for the same service type.

Specifically, in some of the embodiments, a single FEC with the same parameters (such as MCS, coding, N_SS etc.) is assigned to a STA allocated with MRU.

Small RUs and large RUs mentioned above might not be assigned to the same MRU allocation, or an MRU is not assigned, which includes small RUs and large RUs. Small RUs is not assigned across multiple 20 MHz channels in at least one embodiment. In simple words, the MRU includes a combination of 26-RU, 52-RU, or 106-RU in a 20 MHz frequency segment; or the MRU includes combination of 242-RU, 484-RU, or 996-RU in a transmission bandwidth. But the MRU might not include one of 26-RU, 52-RU, and 106-RU in a first 20 MHZ and one of 242-RU, 484-RU, or 996-RU which overlaps another 20 MHZ.

In at least one embodiment, an exception exists that a small RU in a first 20 MHz channel is combined with a RU in another 20 MHz channel.

In some embodiments, the MRUs of small RUs are not limited to contiguous RUs. The schedulers allocate RUs based on SNR (e.g., CQI feedback). In at least one embodiment, any combination of MRU are used.

MRUs are not limited to the combinations of small RUs. Assuming the RMS delay spread is ~⅓CP=~1 μsec, then the coherence BW is ~1 MHz. Therefore, an average SNR on a given RU does not imply about the average SNR on its adjacent RU.

In the embodiments, based on supporting multiple RUs/non-contiguous RUs, the channel utilization is improved by increasing efficiency due to enhancing the capability of leveraging the channel selectivity. Further, the usage of the channel is improved, and will increase the overall system throughput and performance.

Embodiment 1

An EHT-SIG in this embodiment is different from the HE-SIG B specified in 802.11ax, in the following:

A corresponding multiple user-field points to the same STA. A common part is included in the EHT-SIG, and is similar to the structure of the common part of the HE-SIG B. However, multiple user-fields of one STA are included in a User Specific field of the EHT-SIG. For example, a first user field is followed by other duplicated second user-fields. In simple words, an MRU includes a first RU and a second RU. The EHT-SIG accordingly includes a first user field corresponding to the first RU and a second user field corresponding to the second RU. The first user field and the second user field including the same ID of a station.

The first user field is similar to the user field as defined in 802.11ax, but there are different solutions for the other duplicated user-fields, record as a duplicated second user-field(s), or the second user-field.

Specifically, in one example, the duplicated second user-field is the same as the first user-field. This example overcomes the problem of one user field/station mapped to one RU as set forth in 802.11ax, so being cost-efficient with a new chip design.

In another example, the duplicated second user-fields include the STA_ID field and other subfields which carry new signaling content related to MRU instead. Compared to the first example, this solution supports MRU STAs in an easier way.

In the above mentioned examples, the user-fields' size are the same between each other, e.g., 21, 22 or 23 bits. The first user-field is identical/similar to the 802.11ax user-field (the content or structure are mainly the same).

Generally, the location of the combined second RU (corresponding to duplicated user field) is not limited; but in some examples, rules of the location of the combined second RU/duplicated user-field is set to reduce interferences or inefficiency.

The other user-fields' content is one of the following:
Example 1, remains the same of the first user-field;
Example 2, includes content which is different with the first user-field such that:
The first 11 bits are for STA_ID as in the first user-field.
Some of the other bits (e.g., 1 or 2) are used to signal type of the user-field (i.e., the meaning of the following bits).
The remaining bits have any combination of the following content related to MRU:
2 bits indicate N_RU—the number of RUs assigned to the STA (including the first RU), or how many RUs are included in the MRU assigned to the STA. Thus, the STA is capable to identify a failure to decode any of the user-fields and stop the decoding process. Other 8 bits are reserved; or
the size and location of an RU in the MRU assigned to the STA are indicated. For example, in the following way:
For small-RUs: a 9-bit bitmap indicates which 26-tones RUs in the same 20 MHz channel are part of the MRU allocation. A 52-tones RU is indicated by the appropriate 2 bits; a 106 tones RU is indicated by the appropriate 4 bits. The 10th bit is reserved.
For large-RUs: an 8-bits bitmap indicates which 242-tones RUs in the same 80 MHz channel and the next 80 MHz channel are part of the MRU allocation. A 484-tones RU is indicated by 2 bits (2 X 242 tones-RU); a 996-tones RU is indicated by 4 bits (4 X 242 tones-RU). The 9th and 10th bits are reserved. MRU is limited to 160 MHz boundaries in this embodiment. A STA knows that an MRU is assigned to the STA after finishing decoding EHT-SIG. Thus, signaling for the MRU user-field is not used.

Figure 5:
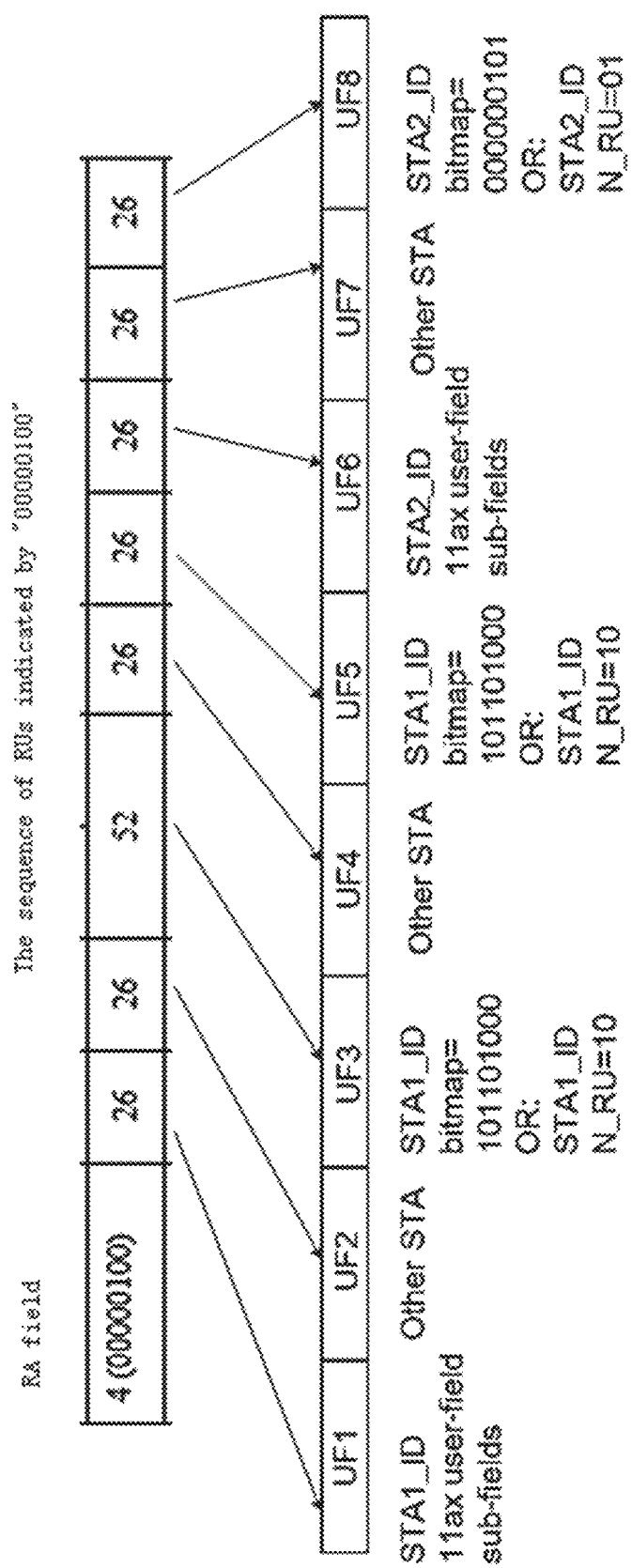
FIG. 5 is a diagram illustrating an example of indication structure according to at least one embodiment.

FIG. 5 illustrates an example of indication structure according to at least one embodiment. A RU allocation (RA) field in the common part of EHT-SIG is set as "00000100", which represents the allocation of a sequence of RUs [26, 26, 52, center-26, 26, 26, 26, 26]. Accordingly, in a corresponding user specific field, 8 user fields (UF) are included. In this example, the UF1 is mapped with the first 26-RU, including information of STA1, such as AID of STA1. The UF2 is mapped with the second 26-RU, includes information of another STA, the content and structure being similar to a user field in 802.11ax.

The UF3 corresponds to the 52-RU, the UF3 includes a station info field which is also set as the AID of STA1. The content of the UF3 includes different examples:

In one example, the UF3 further includes a bitmap "101101000", wherein a bit of the bitmap correspond to a 26-RU respectfully, indicating which 26-RUs are in the MRU assigned/allocated to the STA1. In the example, the "101101000" means the first/third/fourth/6th 26-RU are comprised as an MRU, which is allocated to the STA1.

In another example, the UF3 alternatively further includes a N-RU field instead of the bitmap. The N-RU field indicates the number of the RUs in the sequence of RUs of [26, 26, 52, center-26, 26, 26, 26, 26] that are combined as an MRU, which is allocated to the STA1. In this example, the number of the RUs is 3.

Other UFs are also described in the FIG. 5.

On the station side, a STA obtains the size and location of the sequence of RUs allocated corresponding to a 20 MHz from the RA field, and also obtains whether the STA is scheduled/assigned and on which of one or more RUs the STA is allocated.

For example, the STAs obtains the sequence of RUs allocated corresponding to a 20 MHz, which is a sequence of RUs [26, 26, 52, center-26, 26, 26, 26, 26], based on the "00000100", and further obtain that the STA is scheduled and scheduled on the first, third and 5th RU in the above sequence of RUs (the first, third and 5th is the order in the sequence) based on the UF1, UF3, UF5. That is, the MRU includes "first 26-RU, second 52-RU, the 6th 26-RU", "first 26-RU, second 52-RU, the 6th 26-RU" is the order in the 20 MHz tone plan.

TABLE 27-7

Data and pilot subcarrier indices for RUs in a 20 MHz HE PPDU and in a non-OFDMA 20 MHz HE PPDU

| RU type | RU index and subcarrier range | | | | |
|---|---|---|---|---|---|
| 26-tone RU | RU 1 [−121: −96] | RU 2 [−95: −70] | RU 3 [−68: −43] | RU 4 [−42: −17] | RU 5 [−16: −4, 4: 16] |
|  | RU 6 [17: 42] | RU 7 [43: 68] | RU 8 [70: 95] | RU 9 [96: 121] |  |
| 52-tone RU | RU 1 [−121: −70] | RU 2 [−68: −17] | RU 3 [17: 68] | RU 4 [70: 121] |  |
| 106-tone RU | RU 1 [−122: −17] |  | RU 2 [17: 122] |  |  |
| 242-tone RU | RU 1 [−122: −2, 2: 122] |  |  |  |  |

The subcarrier index of 0 corresponds to the DC tone. Negative subcarrier indices correspond to subcarries with frequecy lower than the DC tone, and positive subcarrier indices correspond to subcarriers with frequency higher than the DC tone.
RU 5 is the middle 26-tone RU.

Figure 6:
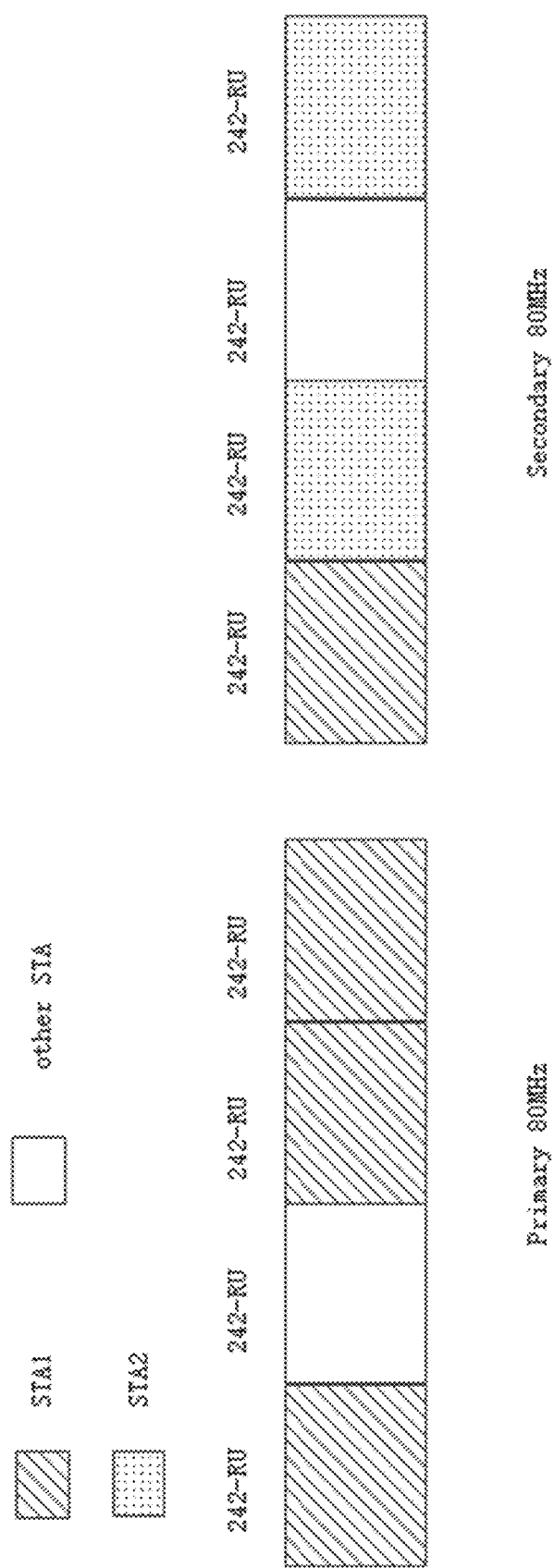
FIG. 6 is a diagram illustrating another example of resource allocation according to at least one embodiment.

As shown in FIG. 6, illustrates another example of resource allocation in according to at least one embodiment, in the 160 MHZ, the first, third, 4th, 5th 242-RU are assigned to STA1; the 6th, 8th 242-RU are assigned to STA2.

There are different solutions of the content of the common part and the UFs in the EHT-SIG indicating the allocation in FIG. 6. The common part is divided into two content channel (CC).

In the example, the common part of CC1 includes "11000000 (RA-1, 242 (1)), 01110010 (RA-3, 484 (0)), 11000000 (RA-5, 242 (1)), 11000000 (RA-7, 242 (1))"; the common part of CC2 includes "11000000 (RA-2, 242 (1)), 11001000 (RA-4, 484 (1)), 11000000 (RA-6, 242 (1)), 11000000 (RA-8, 242 (1))". The "11000000 (RA-1), 01110010 (RA-3), 11000000 (RA-5), 11000000 (RA-7)" in CC1 correspond to the first 20 MHZ, the third 20 MHz, the 5th 20 MHz and the 7th 20 MHz respectively; the "11000000 (RA-2), 11001000 (RA-4), 11000000 (RA-6) and 11000000 (RA-8)" in CC2 correspond to the second 20 MHz, the 4th 20 MHZ, the 6th 20 MHz and the 8th 20 MHz. The "11000000" indicates an allocation of 242 (1), i.e., 242-RU with 1 user field, "01110010" indicates an allocation of 484-RU with 0 user field in the content channel that contains the corresponding 8-bit RU Allocation subfield" 01110010". "11001000" indicates an allocation of 484-RU with 1 user field in the content channel that contains the corresponding 8-bit RU Allocation subfield "11001000". The common part of the CC1 together with the common part of the CC2 indicates the allocation of the 160 MHZ, i.e., the sequence of the RUs [242, 242,484, 242, 242, 242, 242].

See FIG. 7, in the EHT-SIG, CC1 and CC2 are included. The CC1 includes UF1, UF5 and UF7, corresponding to the RA1, RA5, RA7 respectively. The CC2 includes UF2, UF4, UF6 and UF8, corresponding to the RA2, RA4, RA6, RA8 respectively.

UF1 is the first user field including the ID of STA1. UF4 and UF5 are second user field including the ID of STA1 (same to UF1) and a first bitmap, which is 8 bits, a bit of the 8 bits indicating whether a corresponding 242-RU is in the MRU assigned to the STA1 (for example the10111000 indicates the first, third, 4th, 5th 242-RU are assigned to STA1). UF6 and UF8 includes same ID of STA2, in UF8 a second bitmap is included, which is 8 bits or remaining bits except the RUs already allocated in the first bitmap (i.e. 4 bits in this example), a bit of the 8 bits indicating whether a corresponding 242-RU is in the MRU assigned to the STA1 (for example the10111000 indicate that the first, third, 4th and 5th 242-RU are assigned to STA1). UF 2 and UF7 are user field which are not assigned with a MRU, details are not discussed here.

In this example, in response to RU r being a 484-tone or larger RU, which is the largest predefined RU in an MRU, then the number of users allocated to the MRU equals the number of User fields for this RU r in the MRU summed across the EHT-SIG-B content channels, i.e., Nuser (r, CC1)+Nuser (r, CC2), r is the largest RU in the MRU. In the above example, a 484-RU and a 242-RU are included an MRU assigned to STA1, the number of users is decided by the 484-RU: n1 (the second 484-RU, CC1)+n2 (the second 484-RU, CC2)=0+1=1. In this example, one station in the MRU is assigned, but in at least one embodiment multiple stations are assigned to the MRU.

In at least one embodiment, FIG. 8 shows that the resource allocation is similar, but the MRU1 which including the 484-RU are allocated to two stations. In this example, common part of CC1 includes "11000000 (RA-1, 242 (1)), 11001000 (RA-3, 484 (1)), 11000000 (RA-5, 242 (1)), 11000000 (RA-7, 242 (1))"; common part of CC2 includes "11000000 (RA-2, 242 (1)), 11001000 (RA-4, 484 (1)), 11000000 (RA-6, 242 (1)), 11000000 (RA-8, 242 (1))". The "11000000 (RA-1), 11001000 (RA-3), 11000000 (RA-5), 11000000 (RA-7)" in CC1 correspond to the first 20 MHz, the third 20 MHz, the 5th 20 MHz and the 7th 20 MHz respectively; the "11000000 (RA-2), 11001000 (RA-4), 11000000 (RA-6), 11000000 (RA-8)" in CC2 correspond to the second 20 MHz, the 4th 20 MHz, the 6th 20 MHz and the 8th 20 MHz. The "11000000" indicates an allocation of 242 (1), i.e., 242-RU with 1 user field; "11001000" indicates an allocation of 484-RU with 1 user field in the content channel that contains the corresponding 8-bit RU Allocation subfield "11001000". The common part of the CC1 together with the common part of the CC2 indicates the allocation of the 160 MHz, i.e., the sequence of the RUs [242, 242,484, 242, 242, 242, 242].

UF1 corresponds to the first 242-RU in the MRU1, which is the first user field including the ID of STA1.

In the UF3, UF4 correspond to a same 484-RU in the MRU1 assigned to two stations (indicated by RA3 and RA4), for example STA1 and STA3, and includes the ID of STA1 and the ID of STA3 respectively. in response to the UF3 including the ID of STA1, the UF3 is a second user field for STA1 (indicating the second 484-RU is in the MRU1), further including a first bitmap, which is 8 bits, a bit of the 8 bits indicating whether a corresponding 242-RU is in the MRU assigned to the STA1; the UF4 includes the ID of STA3, the UF3 is a first user field for STA3.

Alternatively, in response to the UF3 including the ID of STA3, the UF3 is a first user field for STA3; the UF4 can include the ID of STA1, the UF3 is a second user field for STA1 (indicating the second 484-RU is in the MRU1), further including a first bitmap, which is 8 bits, a bit of the 8 bits indicating whether a corresponding 242-RU is in the MRU assigned to the STA1.

UF5 corresponds to the RA5 (indicating the 5th 242-RU), is a second user field including the ID of STA1 or STA3 (indicating the 5th 242-RU is in the MRU1) and a first bitmap, which is 8 bits, a bit of the 8 bits indicating whether a corresponding 242-RU is in the MRU assigned to the STA1 and STA3 (for example the10111000 indicates the first, third, 4th, 5th 242-RU are assigned to STA1 and STA3).

UF6 and UF8 includes same ID of STA2, in UF8 a second bitmap is used, which is 8 bits or remaining bits except the RUs already allocated in the first bitmap (i.e. 4 bits in this example), a bit of the 8 bits indicating whether a corresponding 242-RU is in the MRU assigned to the STA1 (for example the10111000 indicates the he first, third, 4th, 5th 242-RU are assigned to STA1).

UF 2 and UF7 are user field which are not assigned with a MRU, details are not discussed here.

In this example, in response to RU r being a 484-tone or larger RU, which is the largest predefined RU in an MRU, then the number of users allocated to the MRU equals the number of User fields for this RU r in the MRU summed across the EHT-SIG-B content channels, i.e., Nuser (r, CC1)+Nuser (r, CC2), r is the largest RU in the MRU. In the above example, a 484-RU and a 242-RU are included an MRU assigned to STA1, the number of users is decided by the 484-RU: n1 (the second 484-RU, CC1)+n2 (the second 484-RU, CC2)=1+1=2. in this example, two stations in the MRU are assigned, but in at least one embodiment more than two stations are assigned to the MRU.

In at least one embodiment, modifying the remaining bits in duplicated user-fields enables an indication of additional MRU info; and additional entries in the RU Allocation subfield are not used; and MRU definition and signaling is simple.

Embodiment 2

In the second embodiment, the EHT-SIG includes a common field which accommodates additional RUs, and in which the RU allocation includes combinations of RUs (MRU). In addition, a user-specific field that has a sub-field that defines MRU allocations, which is different from the 802.11ax user-specific field.

FIG. 9a, 9b, 9c illustrates an example of the common field of the EHT-SIG according to at least one embodiment. In the common field of the EHT-SIG, one or more fields are included beside an RA field and other information (e.g., the RA field corresponding to a 20 MHz segment or a 40 MHz segment is longer than in the prior art to allow more allocations or allow more STA assigned).

The one or more fields includes a first field and/or a second field. The first field, N_MRU_1, corresponds to a 20 MHz segment exists in the overall BW, which occupies N x 2 bits, the first field indicates a number of MRUs (a small MRU includes a RU with a small size, such as a 26 RU, a 52 RU or a 106 RU) exists in a 20 MHz channel. The second field, N_MRU_2, corresponds to the entire bandwidth of the transmission, indicates a number of (how many) MRUs with a larger size (a large MRU includes a RU such as a 242-RU, a 484-RU, or a 996 RU) in the bandwidth of the transmission. Specifically, the N_MRU_2 is the same for CC1 & CC2 as the N_MRU_2 refers to the entire BW. N_MRU_1 refers to 20 MHz separately, so N_MRU_1 is most probably different between CC1 and CC2.

Details are as the following:

N_MRU_1 field (N x Nb bits)-which is also called a number of small MRU field, this field indicates a number of (how many) small MRU allocated/exist in the corresponding 20 MHz channels/frequency segment. This field is located following the RU allocation (RA) subfield respectively in a content channel (CC) of the EHT-SIG. The total overheads of the N_MRU_1 field in the EHT-SIG is N x Nb bits, N is the number of 20 MHz channels in CC1 or CC2, Nb is 1 or 2. A small MRU is a RU combined by several small RU with size of any of 26, 52, or 106. The RUs in a small MRU includes different sizes of small RU, and the small MRU is larger than 106, but a small MRU is within a 20 MHz, otherwise a larger RU such as a 242-RU, 484-RU, 996 RU, or 2×996 RU is indicated. A single MRU is available per 20 MHz frequency segment. Hence this field uses 1 bit or 2 bits, so in response to 1 bit being implemented then '1' indicates that there exist an MRU in a corresponding 20 MHz frequency segment and '0' indicates no MRU in a corresponding 20 MHz frequency segment. This is applicable to at least one embodiment described later.

N_MRU_2 field-which is also called a number of large MRU field, this field indicates a number (how many) of large MRU allocation exist in the entire BW. This field is located before the CRC & Tails of a CC, respectively in the EHT-SIG. The total overheads of the N_MRU_2 field in the EHT-SIG is 2 bits, N is the number of 20 MHz frequency segments. A large MRU is a RU combined by several large RU with size of any of 242, 484, or 996. The RUs in a large MRU includes different sizes of large RU, and the large MRU is larger than 996, but a large MRU is within the full bandwidth of the transmission.

FIG. 9a illustrates a structure of a common part of EHT-SIG B in a 20 MHz bandwidth transmission according to at least one embodiment.

FIG. 9b illustrates a structure of a common part of EHT-SIG B in a 40 MHZ bandwidth transmission according to at least one embodiment.

FIG. 9c illustrates a structure of common part of EHT-SIG B in an 80 MHz bandwidth transmission according to at least one embodiment. Other structure of a common part of EHT-SIG B in another bandwidth is similar and will not be repeated herein.

FIG. 10a describes an example of resource allocation and the station scheduled on the RU(S) according to at least one embodiment. FIG. 10b describes a structure of a common field of the EHT-SIG, which indicates the resource allocation of FIG. 10a. The common field includes: a RU allocation subfield "00000100" which indicates the allocation which represents [26, 26, 52, center 26, 26, 26, 26]. The first field "10" indicates that there are 2 MRUs in the corresponding 20 MHz channel (the MRU for STA1 and the MRU for STA2 in FIG. 9a above). The second field "00" indicates that there are no MRUs of large RUs. The common field further includes a RU allocation subfield "00001011" which indicates the allocation which represents [52, 26, 26, center 26, 52, 52]. The first field "10" indicates that there are 2 MRUs s in the corresponding 20 MHz channel (the MRU for STA3 and STA4 in FIG. 9a). The second field "00" indicates that there are no MRUs of large RUs.

Figure 11A:
FIG. 11a is a diagram illustrating an example of structure of the user specific field of the EHT-SIG according to at least one embodiment.
Figure 11B:
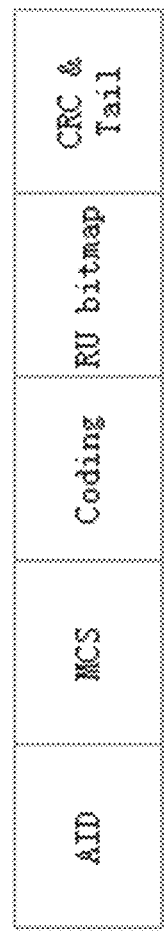
FIG. 11b is a diagram illustrating an example of structure to the MRU user field in the user specific field of an EHT-SIG according to at least one embodiment.

FIG. 11a describes an example of structure of the user specific field of the EHT-SIG according to at least one embodiment. The user specific field includes 2 sub-fields:

an MRU user specific field, normally precedes a single-RU specific field, the Single-RU user specific field. A Single-RU user specific field includes one or more the Single-RU user fields assigned on a Single-RU, which is a normal RU that is not combined with other RU(s). An MRU user field corresponding to an MRU, including at least the following: a STA_ID and a RU bitmap indicating size and location of an RU included in the MRU. FIG. 11b illustrated an example of structure to the MRU user field in the user specific field of the EHT-SIG according to at least one embodiment.

Figure 12A:
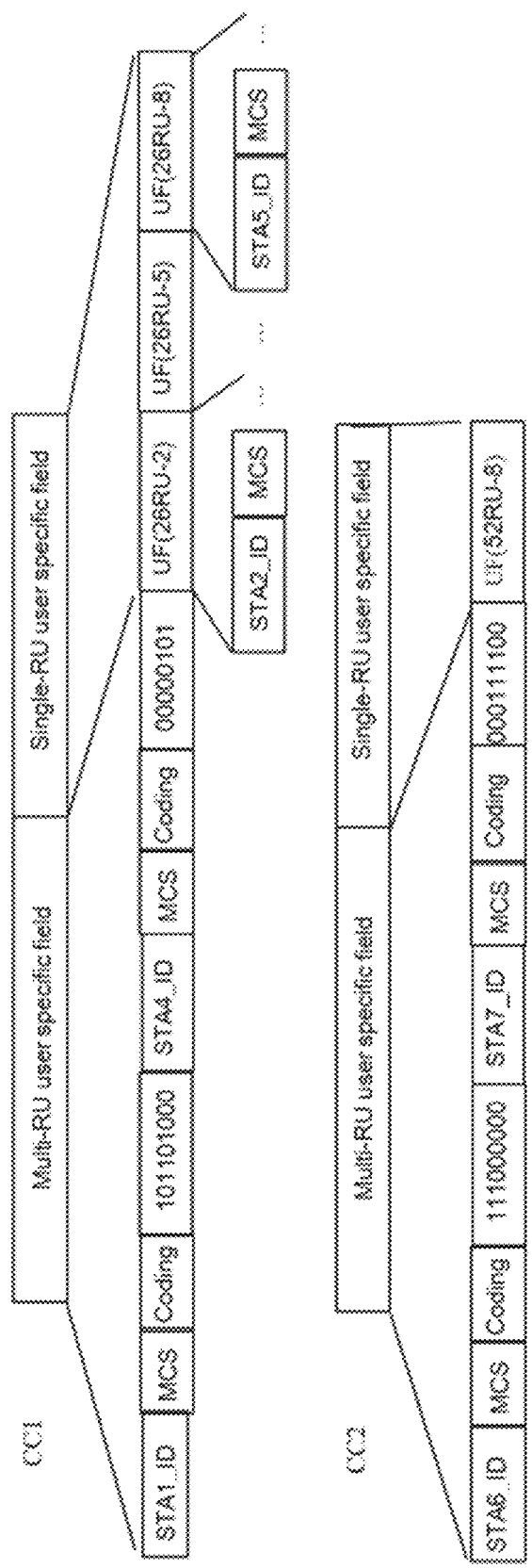
FIG. 12a and FIG. 12b are diagrams illustrating a structure of the user fields in a user specific field of an EHT-SIG according to at least one embodiment.
Figure 12B:
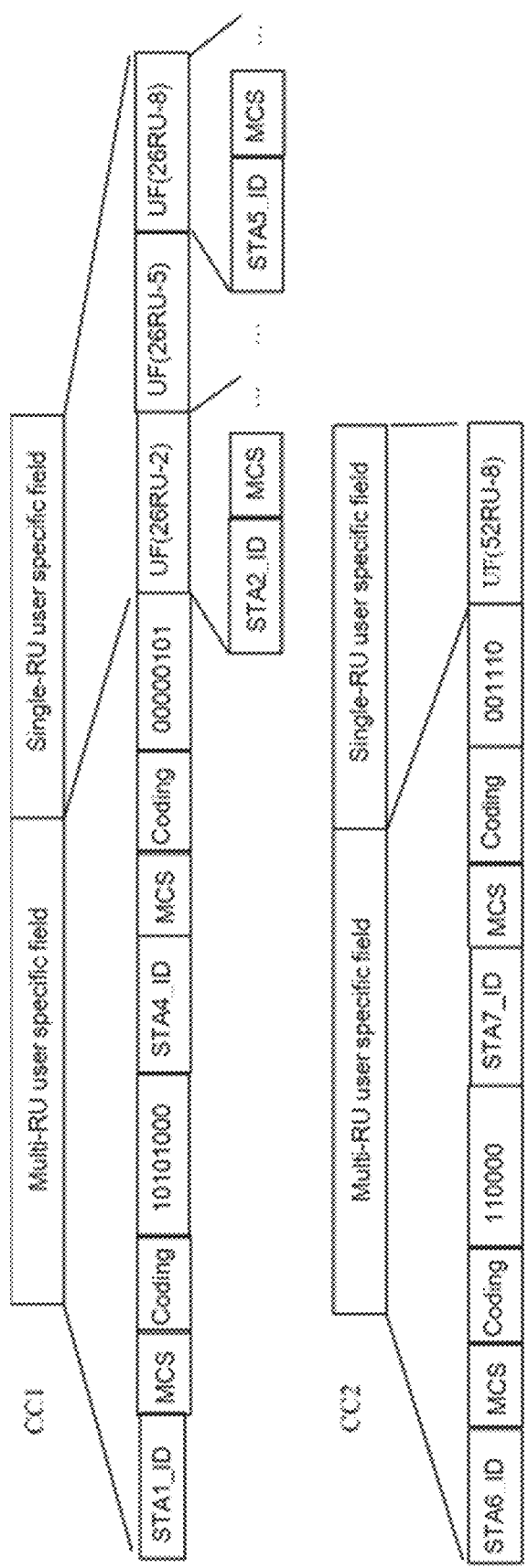

Following the example of FIG. 10a, FIG. 12a and FIG. 12b illustrate a structure of the user fields in a user specific field of the EHT-SIG according to at least one embodiment. The MRU user field contains the following information:

a STA_ID (11 bits), MCS (4 bits), Coding (1 bit), a RU bitmap, which RU bitmap indicates RUs that belong to the same MRU allocation, CRC & Tail (10 bits).

Specifically, the RU bitmap indicating size and location of an RU included in the MRU is indicated by at least two method. For one example, for small RUs there are 9 26-tones RUs, therefore the RU bitmap in a CC includes 9 bits, wherein the bits map to a 26-RU, see FIG. 12a.

Alternatively, in another example, based on the RU allocation field indicates the sequence of the RUs (for example FIG. 10b), the number of RUs in a 20 MHz frequency segment is extracted from the common field. The RU bitmap in a CC includes several bits. The number of bits equals to the number of the RUs in the allocation of the 20 MHz frequency segments. The bits map a RU in the sequence of the RUs respectively; see FIG. 12b. The RU bitmap in CC1 includes 8 bits since the sequence of the RUs of the first 20 MHz frequency segment includes 8 RUs. A bit maps an RU in the 8 RUs. The RU bitmap in CC2 includes 6 bits since the sequence of the RUs of the first 20 MHz frequency segment includes 6 RUs, wherein the bits map to a RU in the 6 RUs.

In another example, for large RUs there are 16 242-tones RUs in a 320 MHz bandwidth (BW); similarly, the RU bitmap in a user field of an EHT-SIG includes 16 bits, wherein a bit maps a 242-tones RU, and indicates whether the 242-tones RU is included in the MRU.

In at least one embodiment, by separating MRU user-specific and Single-RU user specific fields, MRU information is added, Same error probability of SIG-B per STA, For MRU that includes 3 or more RUs total size is reduced.

Embodiment 3

In some embodiments, new RU sizes are defined, which new size is called an MRU.

Accordingly, the RU-Allocation subfield includes entries/indexes indicating the allocation including the MRU.

In this embodiment, the user-specific field will not be increased because a single user-field is used for an RU or MRU. That is, it's not necessary that multiple user fields are included corresponding to an MRU.

As mentioned, the RUs assignment is decided by the AP according to various criterion. Resources of a station in a transmission is considered in response to determining the RU or MRU.

The following table 1 is an example of the resources used (especially smaller than a 20 MHz) and the RU or MRU based on the used resources.

TABLE 1

| Resources needed at most(number of subcarriers) by a station | RU/MRUs/full bandwidth |
|---|---|
| 1 × 26 | 26-RU |
| 2 × 26 | 26 + 26 MRU; 52-RU; |
| 3 × 26 | 26 + 26 + 26 MRU; 52 + 26 MRU |
| 4 × 26 | 26 + 26 + 26 + 26 MRU; 52 + 26 + 26 MRU; 52 + 52 MRU; 106-RU |
| 5 × 26 | 26 + 26 + 26 + 26 + 26 MRU; 26 + 26 + 26 + 52 MRU; 26 + 52 + 52 MRU; 106 + 26 MRU; etc . . . |
| 6 × 26 | 26 + 26 + 26 + 26 + 26 + 26 MRU; 26 + 26 + 26 + 26 + 52 MRU; 26 + 26 + 52 + 52 MRU; 106 + 26 + 26 MRU; 106 + 52 MRU, etc. |
| 7 × 26 | 26 + 26 + 26 + 26 + 26 + 26 MRU; 26 + 26 + 26 + 26 + 26 + 52 MRU; 26 + 26 + 26 + 52 + 52 MRU; 106 + 26 + 26 + 26 MRU; 106 + 52 + 26 MRU, etc. |
| 8 × 26 | 26 + 26 + 26 + 26 + 26 + 26 + 26 MRU; 26 + 26 + 26 + 26 + 26 + 26 + 52 MRU; 26 + 26 + 26 + 26 + 52 + 52 MRU; 106 + 26 + 26 + 26 MRU; 106 + 26 + 52 + 26 MRU; 106 + 106 MRU, etc. |
| 9 × 26 | 26 + 26 + 26 + 26 + 26 + 26 + 26 + 26 + 26 MRU; 26 + 26 + 26 + 26 + 26 + 26 + 26 + 52 MRU; 26 + 26 + 26 + 26 + 26 + 26 + 52 + 52 MRU; 106 + 26 + 26 + 26 + 26 + 26 MRU; 106 + 26 + 26 + 52 + 26 MRU; 106 + 26 + 106 MRU; 242-RU; full bandwidth in a 20 MHz PPDU, etc . . . |

The new table of RU Allocation subfield are based on one or more of the above RU/MRUs, and number of the MRU, locations of an RU in the MRU is also considered. The more flexible the MRU is, the more indexes are used. RUs/MRUs are defined and limited to reduce the complexity of the RU Allocation subfield.

The following table 2 is another example of the used resources (especially larger than a 20 MHZ, 320 MHz bandwidth is supported) and the RU or MRU based on the used resources.

TABLE 2

| Resources needed at most(number of subcarriers) by a station | RU/MRUs |
|---|---|
| 1 × 242 | 242-RU; full bandwidth in a 20 MHz PPDU |
| 2 × 242 | 242 + 242 MRU; 484-RU; full bandwidth in a 40 MHz PPDU |
| 3 × 242 | 242 + 242 + 242 MRU; 484 + 242 MRU |
| 4 × 242 | 242 + 242 + 242 + 242 MRU; 242 + 242 + 484 MRU; 484 + 484 MRU; 996-RU; full bandwidth in a 80 MHz PPDU |
| 5 × 242 | 242 + 242 + 242 + 242 + 242 MRU; 242 + 242 + 242 + 484 MRU; 242 + 484 + 484 MRU; 996 + 242 MRU, etc. |
| 6 × 242 | 242 + 242 + 242 + 242 + 242 + 242 MRU; 242 + 242 + 242 + 242 + 484 MRU; 242 + 242 + 484 + 484 MRU; 242 + 242 + 996 MRU, 996 + 484 MRU |
| 7 × 242 | 242 + 242 + 242 + 242 + 242 + 242 + 242 MRU; 242 + 242 + 242 + 242 + 242 + 484 MRU; 242 + 242 + 242 + 484 + 484 MRU; 242 + 242 + 242 + 996 MRU; 996 + 484 + 242 MRU |
| 8 × 242 | 242 + 242 + 242 + 242 + 242 + 242 + 242 + 242 MRU; 242 + 242 + 242 + 242 + 242 + 242 + 242 MRU; 484 MRU; 242 + 242 + 242 + 242 + 484 + 484 MRU; 242 + 242 + 242 + 242 + 996 MRU; 996 + 484 + 242 + 242 MRU; 2 × 996-RU; full bandwidth in a 160 MHz |
| 9 × 242 | . . . 2 × 996 + 242 MRU |
| 10 × 242 | . . . 2 × 996 + 484 MRU |
| 11 × 242 | . . . 2 × 996 + 484 + 242 MRU |
| 12 × 242 | . . . 2 × 996 + 996 MRU |
| 13 × 242 | . . . 2 × 996 + 996 + 242 MRU |
| 14 × 242 | . . . 2 × 996 + 996 + 484 MRU |
| 15 × 242 | . . . 2 × 996 + 996 + 484 + 242 MRU |
| 16 × 242 | . . . full bandwidth in a 320 MHz PPDU |

Figure 13:
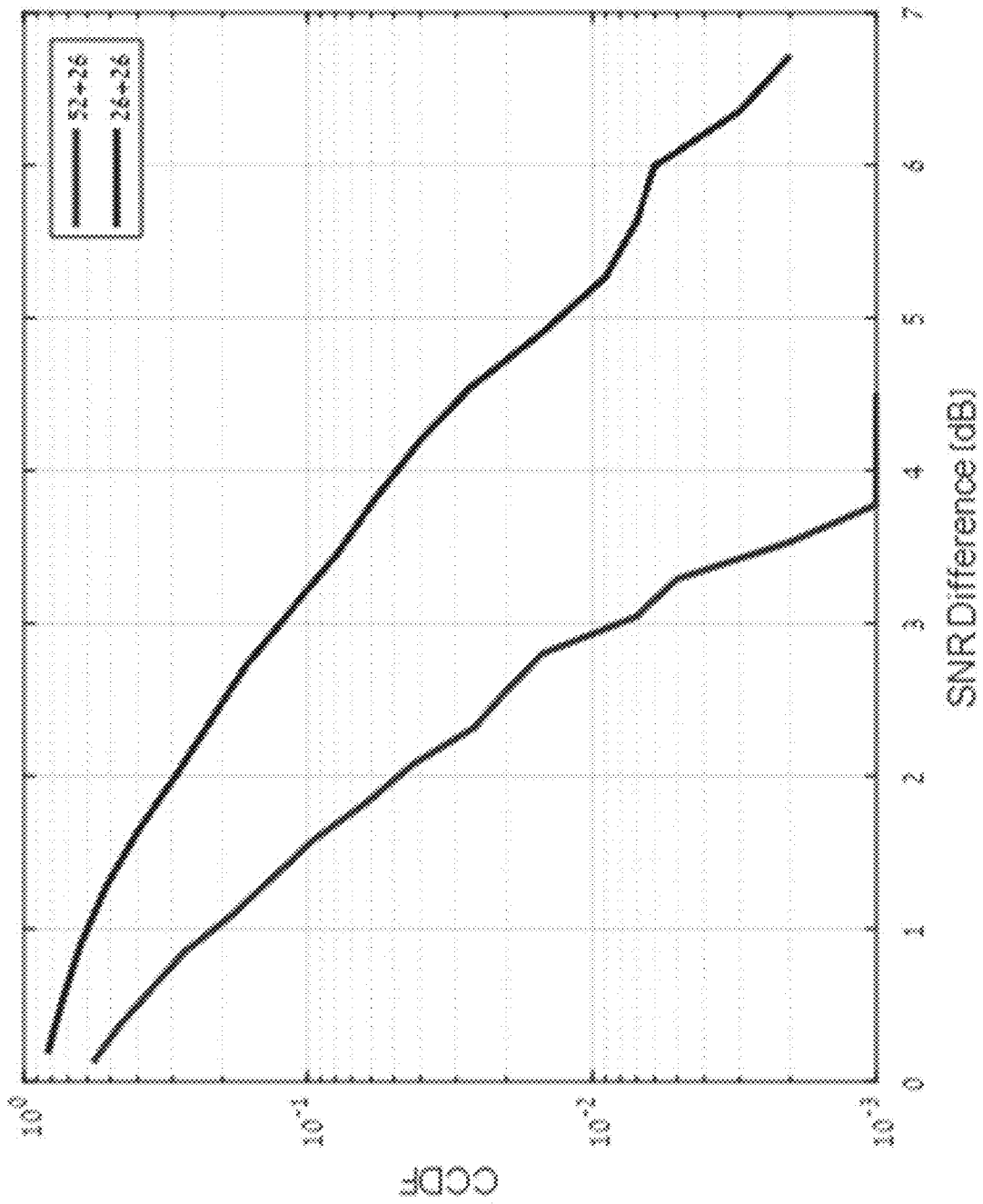
FIG. 13 is a diagram illustrating simulation results according to at least one embodiment.

To reduce complexity of the indication and meet the use of resources more efficiently, MRUs are provided. See FIG. 13, where simulation results show that combining the best 26-RU to RU>26 to form an MRU yields negligible SNR gain where combining the best 26-RU to a given 26-RU gives >3 dB SNR.

Hence, for a 20 MHz frequency segment, in an example, an MRU includes a combination of a middle 26-RU and adjacent 52-RUs/106-RUs, or a combination of 2 26-RUs that are different from the already defined 52-RU, which is also referred to as an aggregated middle 26-RU and contiguous 52-RUs or 106-RUs, or aggregated non-contiguous 26-RUs.

But even with the above restrictions, there are still too many entries used to support other MRU combinations so expanding the RU Allocation table is impractical in some situation.

TABLE 3

| # | Combination | Additional entries required in RA subfield of 802.11 be | Remark |
|---|---|---|---|
| 1 | Single MRU: Inner 52-RU + | 48 | There are 10 entries for each 52-RU + middle26-RU |

TABLE 3-continued

| # | Combination | Additional entries required in RA subfield of 802.11 be | Remark |
|---|---|---|---|
| | middle 26-RU | | in RA subfield |
| 2 | Single MRU: 106-RU + middle 26-RU | 96 | Including MU-MIMO |
| 3 | Single MRU: 2 × 26 | 384 | Including MU-MIMO when allocation contains RU-106 Too many entries, may consider cancelling MU-MIMO for 106-RU |
| 4 | Single MRU: 2 × 26 (w/o MUMIMO) | 214 | |
| 5 | Two MRUs: 2 × 26 + 2 × 26 | Hundreds | Too many entries requires too much overhead, therefore makes this impractical |
| 6 | Other combinations of MRU | Tens of thousands | |

Figure 14:
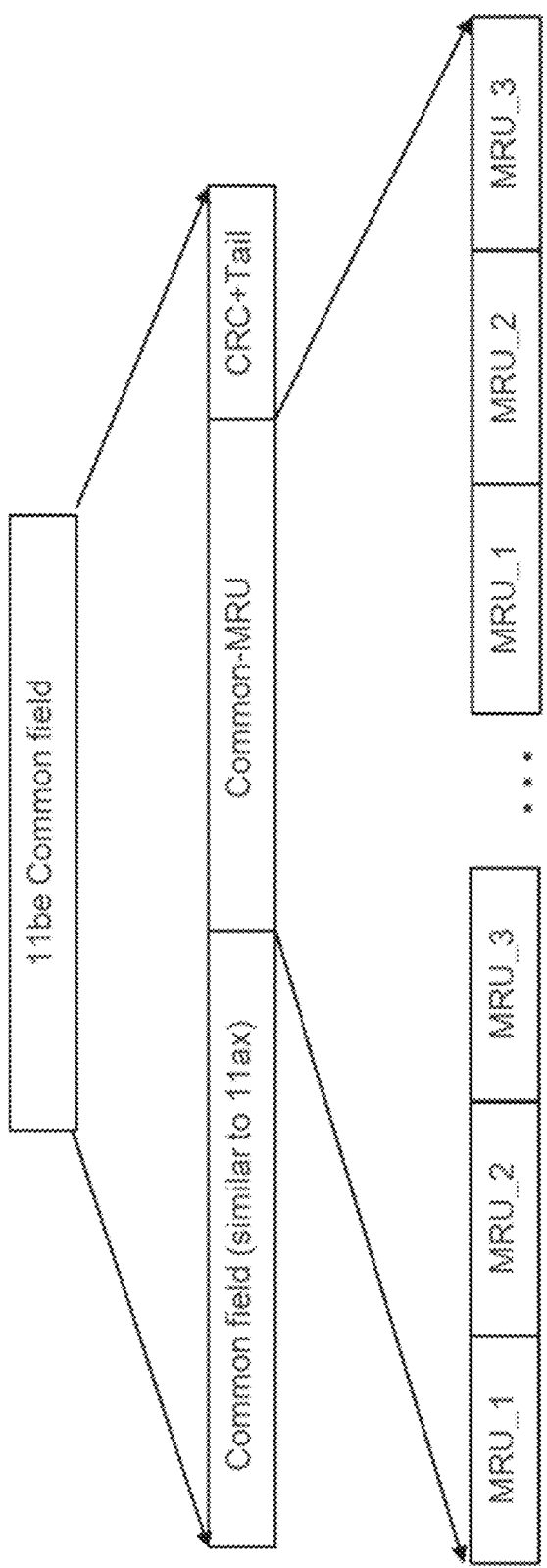
FIG. 14 is a diagram illustrating another example of indication structure of a Common-MRU according to at least one embodiment.

See the table 3, there are too many entries used to support other MRU combinations for example: 2 concurrent MRUs of 2×26-RU. Therefore, instead of expanding the RU Allocation subfield to a huge dimension, in an alternative embodiment 3, a new field is included for indicating the size and location of an RU aggregated in a MRU, which is called Common-MRU. Examples are illustrated in FIG. 14.

This Common-MRU field exists in case any MRU exists in the PPDU (in any of the 20 MHz channels). Therefore, the Common-MRU-field is signaled either in a U-SIG previous to the EHT-SIG, or as an additional bit(s)/fields in the common field of the EHT-SIG.

For Small MRUs:

This Common-MRU field is encoded separately.

This Common-MRU field includes 3 bitmap subfields, as following:

MRU_1-is 9 bits, indicates which 26-RUs are comprised in a 1st MRU.

MRU_2-is 7 bits, indicates which 26-RUs are comprised in a 2nd MRU.

MRU_3-is 5 bits, indicates which 26-RUs are comprised in a 3rd MRU.

So, additional 21 (22 bits including the signaling bit which indicates whether an MRU is present/exists) are used for signaling any combination of up to 3 MRUs per 20 MHz frequency segment.

The amount of additional bits will be saved later due to the reduction in number of user-fields in the user-specific field.

In this embodiment, although the common-NRU field appears to high overhead, a larger amount of additional bits will be saved later due to the reduction in the number of user-fields in the user-specific field.

For Large MRUs:

Large MRUs are identified by the corresponding RU Allocation subfield for RU>=242 tones.

In this case the Common-MRU field (bitmap) indicates which other RUs (>242) correspond to a same MRU.

MRU_1-is 8 bits (9th bit is omitted): indicate which 242-RU belong to the MRU

MRU_2-omitted

MRU_3-omitted

Similar to the small MRU case, the user-specific field overhead is also reduced.

That is, for a MRU indicated, one or more user fields are included, no ID of station is repeated in different user field. Numbers stations or user fields indicated by the RU allocation field(s) still works in response to the station determining which RU/MRU is allocated to the station.

The user-specific field are included in the EHT-SIG, each RU/MRU indicated by the RU Allocation subfield and/or Common-MRU field is mapping to one or more user fields, usually the user fields are mapped to the MRU/RU in sequence. Since the location of the RUs in the MRU is alternating, there are some rules for the mapping the MRU and the one or more user-fields assigned to the MRU. In an example, the MRU's location is specified by the location of the first RU in lowest frequency domain. See the FIG. 17a, where based on the frequency order of the 26-RU1, 26-RU 2 and the52-RU 2, the MRU1 is the one in which the 26-RU1 is the lowest RU, the MRU 2 is the one in which the 26-RU 2 is the lowest RU, the MRU3 is the one in which the 52-RU 2 is the lowest RU.

The one or more user-fields of an MRU/RU is mapped to the MRU/RU in similar way in 802.11ax. A user-field location of an MRU will be in accordance with the RU of the lowest frequency as shown in the 2 examples in FIGS. 15 and 1010. In at least one embodiment, a user-field of an MRU points to the first RU (the RU located in the lowest frequency) of the MRU.

For MRU larger than 242-RU (or 106RU), MU-MIMO is supported, number of the user field corresponding to the MRU is also indicated. In response to the content being divided to CC1 and CC2, the number of the user field corresponding to the MRU in the CC1 and CC2 are respectively indicated.

In this solution, a STA can decode the user-specific field similarly to the way a STA does on 802.11ax. In response to decoding the user-specific field, STAs use the RU/MRU allocation or structure (signaled in the common field) to obtain the user fields on the RU/MRU. In at least one embodiment, the rest of the RUs of the same MRU are skipped.

Figure 15:
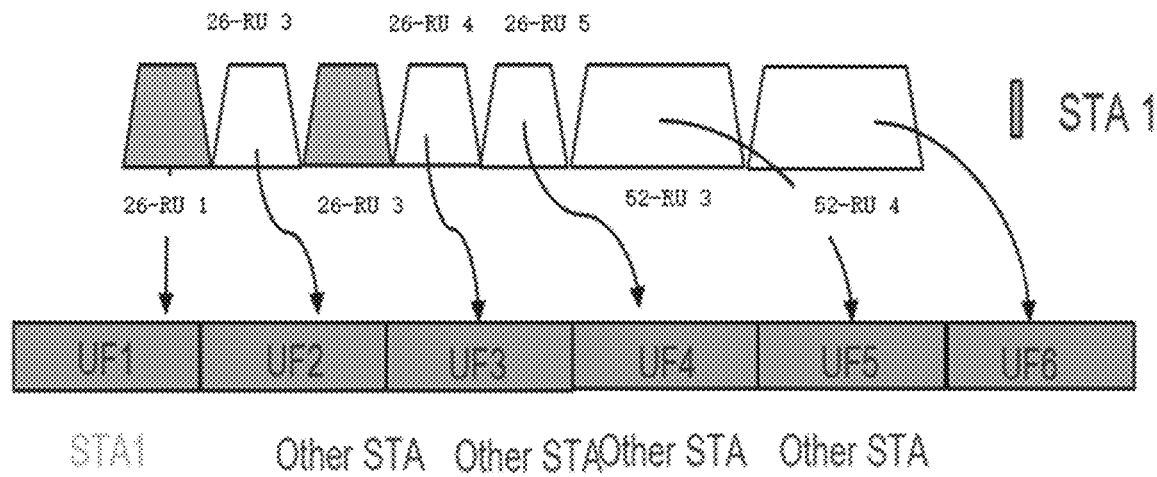
FIG. 15 is a diagram illustrating an example of resource allocation and UR mapping according to at least one embodiment.
Figure 16:
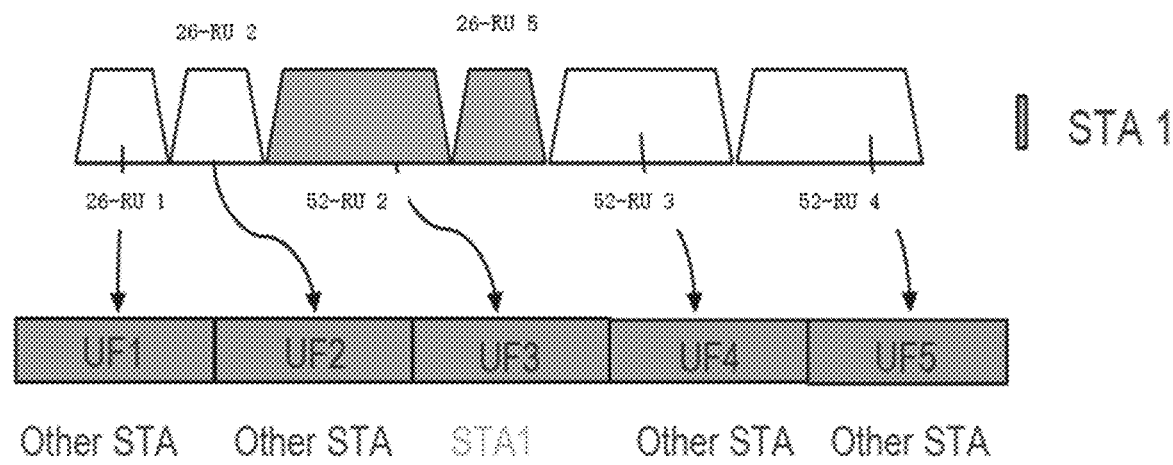
FIG. 16 is a diagram illustrating an example of resource allocation and UR mapping according to at least one embodiment.

For example, of the FIG. 15, MRU1 includes the 26-RU-1 and 26-RU 3, the location of sequence/order of the MRU/RU is [MRU1, 26-RU 2, 26-RU 4, 26-RU 5, 52-RU 3, 52-RU 4], the user fields are mapped to the MRU/RU in sequence. For example, of the FIG. 16, MRU1 includes the 52-RU 2 and 26-RU 5, the location of sequence/order of the MRU/RU is [26-RU1, 26-RU 2, MRU1, 52-RU 3, 52-RU 4], the user fields are mapped to the MRU/RU in sequence.

Figure 17A:
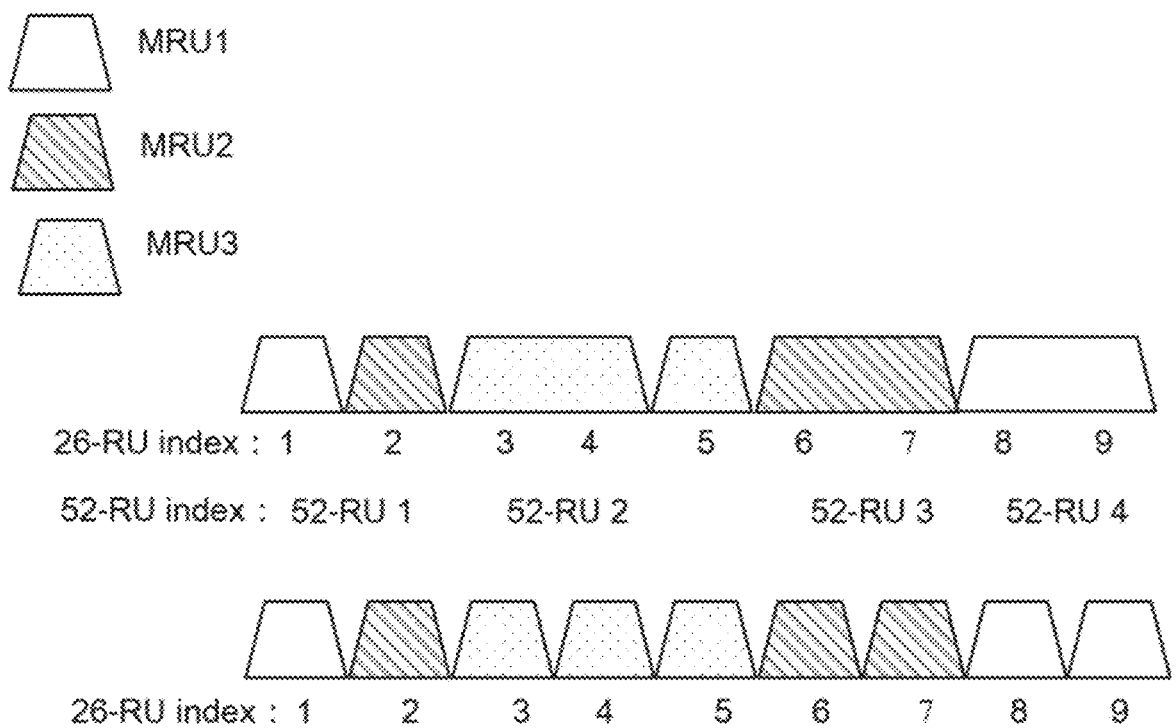
FIG. 17a is a diagram illustrating another example of resource allocation according to at least one embodiment.

FIG. 17a illustrated an example of RU/MRU allocation, which including 3 M-RU in a 20 MHz frequency segment. The common field "1 00000111100000001101000 1 1 0 0 1 1 1" includes, see FIG. 17b, an MRU indication, a RU allocation subfield, a first MRU bitmap, a second MRU bitmap, a third MRU bitmap. Details are in the following:

The MRU indication, which is 1 bit, indicating whether any MRU exists in the allocation;

The RU allocation subfield, which is 8, 9 or 10 bits, indicating the sequence of the RUs (size and location of each RU) corresponding to the 20 MHz frequency segment. In the example, the "00000111" indicates the allocation of [26, 26, 52, middle-26, 52, 52].

The first MRU bitmap, marked as MRU_1, indicating which 26-RU is in the first MRU. In the example, the 100000011 indicates the first, 8th and 9th 26-RUs are combined as the first MRU. The first MRU bitmap usually started with 1 (MSB is 1), which indicated the MRU including the 26-RU on the left edge.

The second MRU bitmap, marked as MRU_2, indicating which 26-RU is in the second MRU. In the example, the 0100011 indicates the second, 6th and 7th 26-RUs are combined as the second MRU. Here, 6 bits are used, therefore MSB is 0.

The third MRU bitmap, marked as MRU_3, indicating which 26-RU is in the third MRU. In the example, the 00111 indicates the second, 6th and 7th 26-RUs are combined as the second MRU. Here, 3 bits are used, therefore 2 MSB are 0.

Figure 17B:
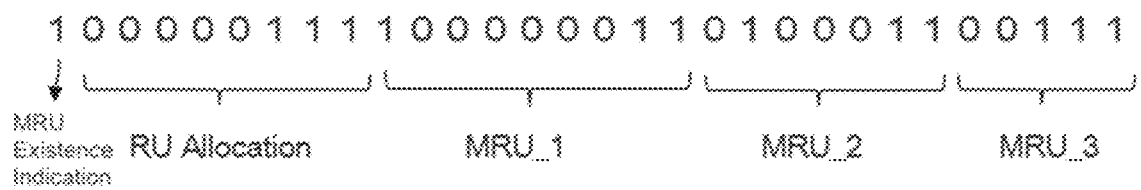
FIG. 17b is a diagram illustrating an indication structure of the resource allocation in the FIG. 17a according to at least one embodiment.
Figure 17C:
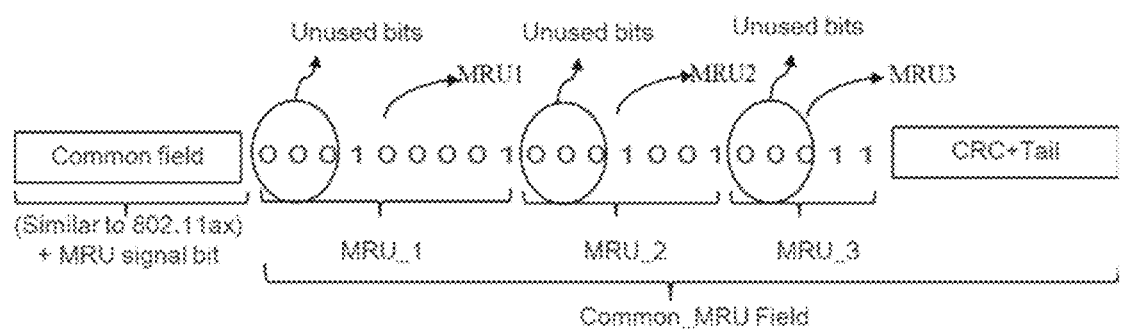
FIG. 17c is a diagram illustrating another indication structure of the resource allocation in the FIG. 17a according to at least one embodiment.

FIG. 17c, based on the same example of RU/MRU allocation, an alternative embodiment is described in the following: The RU allocation field in the common field of an EHT-SIG: indicating the size and location of RU(s) for a frequency segment, and the common field of an EHT-SIG further includes one or more common-MRU fields, a common-MRU field indicating a RU indicated by the RU allocation field (i.e. an allocated RU) is in a MRU. In contrast to the embodiment described with respect to FIG. 17b, a granularity is used for the indication of MRU. The length of the common-MRU fields is decreasing in order, the order of the common-MRU fields is based on the first RU in the MRU in frequency domain.

For example, the RU allocation field is set as 0 0 0 0 0 1 1 1.

The common-MRU field: Using a bitmap that is corresponding to the actual number of RUs, each bit indicating whether an RU indicated by the RU allocation field is in an MRU. The unused bits are set to '0'.

The bits used in this solution are much shorter than shown in FIG. 17b. See FIG. 17c, where the bits are allocated according to 6 bits for MRU_1, 4 bits for MRU_2 and 2 bits for MRU_3.

The RU allocation field: 0 0 0 0 0 1 1 1

Common-MRU field 1, MRU_1, indicating which RU is in the 1st MRU. For example, 0 0 0 1 0 0 0 1. Here, 6 bits 1 0 0 0 0 1 are used, therefore 3 MSB are set to 0 or for other functions, the first 3 bits are omitted.

Common-MRU field 2, MRU_2: 0 0 0 1 0 0 1. Here, 4 bits are used, therefore 3 MSB is set to 0, or for other function, or be omitted.

Common-MRU field 3, MRU_3: 0 0 0 1 1. Here, 2 bits are used, therefore 3 MSB is set to 0, or for other functions.

The order of the Common-MRU field is in according with the order of the first RU in the MRU in frequency domain. See the FIG. 17a.

Figure 18:
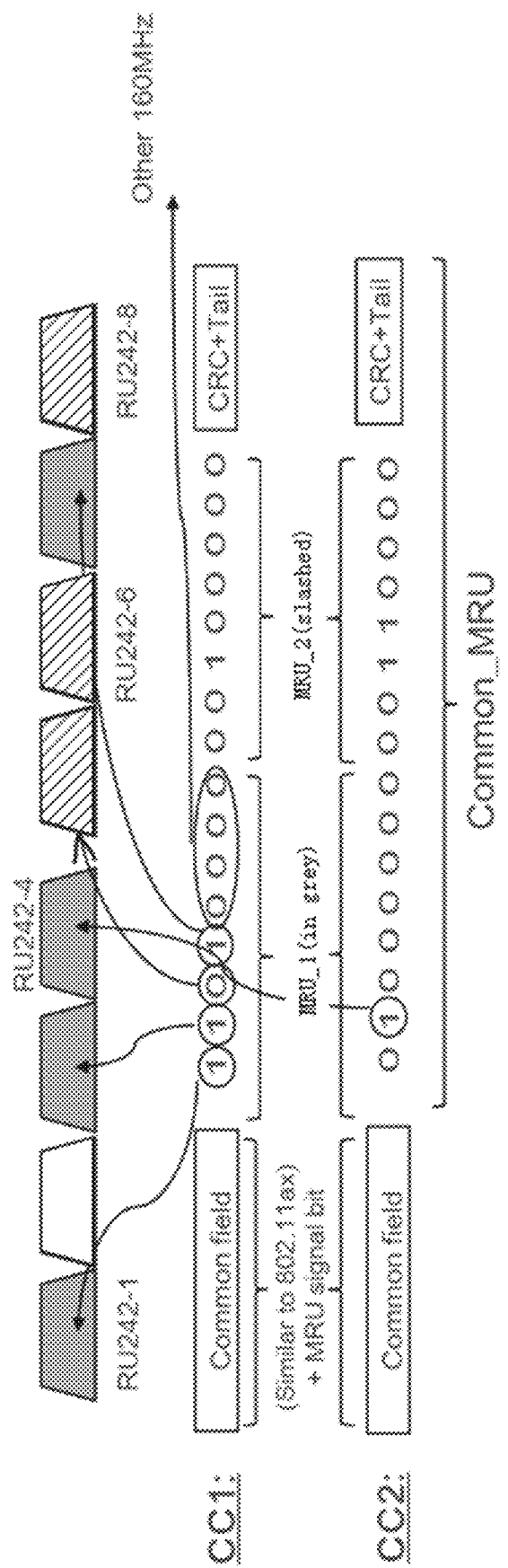
FIG. 18 is a diagram illustrating another example of resource allocation and its indication structure according to at least one embodiment.

FIG. 18 shows the RU/MRU allocation per 160 MHz BW for large MRU according to at least one embodiment. In FIG. 28, there are 2 MRUs, one MRU includes the 242-RU 1, 242-RU 3, 242-RU 4 and 242-RU 7 (show in grey). The other MRU includes the 242-RU 5, 242-RU 6 and 242-RU8.

The EHT-SIG includes CC1 and CC2. The information of EHT-SIG is split into CC1 and CC2 to reduce overheads and increase robust of the information.

The common field of CC1 includes: RU allocation information (field) per 20 MHz or per 40 MHz frequency segments, for odd numbered 20 MHz or 40 MHz frequency segments. For example, in this example, 1 1 1 0 0 x x x for a 20 MHz frequency segments.

The common field of CC2 includes: RU allocation information (field) per 20 MHz or per 40 MHz frequency segments, for even numbered 20 MHz or 40 MHz frequency segments. For example, in this example, 1 1 1 0 0 x x x for a 20 MHz frequency segments.

In alternative solutions, the above common field is omitted by other solutions, or be indicated in the way described in the other embodiments.

The MRU_1 is valid and is 8 bits of length.

The MRU_1 field in the CC1 is corresponding to the odd numbered 20 MHz or 40 MHz segments too. FIG. 18 shows that the beginning four bits respectively maps to the 1st, 3d, 5th and 7th 20 MHz segments in the primary 160 MHz or the 160 MHz BW. In response to the BW being 320 MHZ, the following four bits respectively maps to the 9th, 11th, 13th and 15th 20 MHz segments.

The MRU_1 field in the CC2 is corresponding to the even numbered 20 MHz or 40 MHz segments too. In the example of FIG. 18, the beginning four bits respectively maps to the 1st, 3d, 5th and 7th 20 MHz segments in the primary 160 MHz or the 160 MHz BW. In response to the BW being 320 MHZ, the following four bits respectively maps to the 9th, 11th, 13th and 15th 20 MHz segments.

Similarly, the MRU_2 field indicates the RUs in the MRU2 by the similar method of MRU_1 field.

In some solutions, MRU_2 and MRU_3 are omitted based on the MRU signal bit and the RA subfield in the common part.

Figure 19:
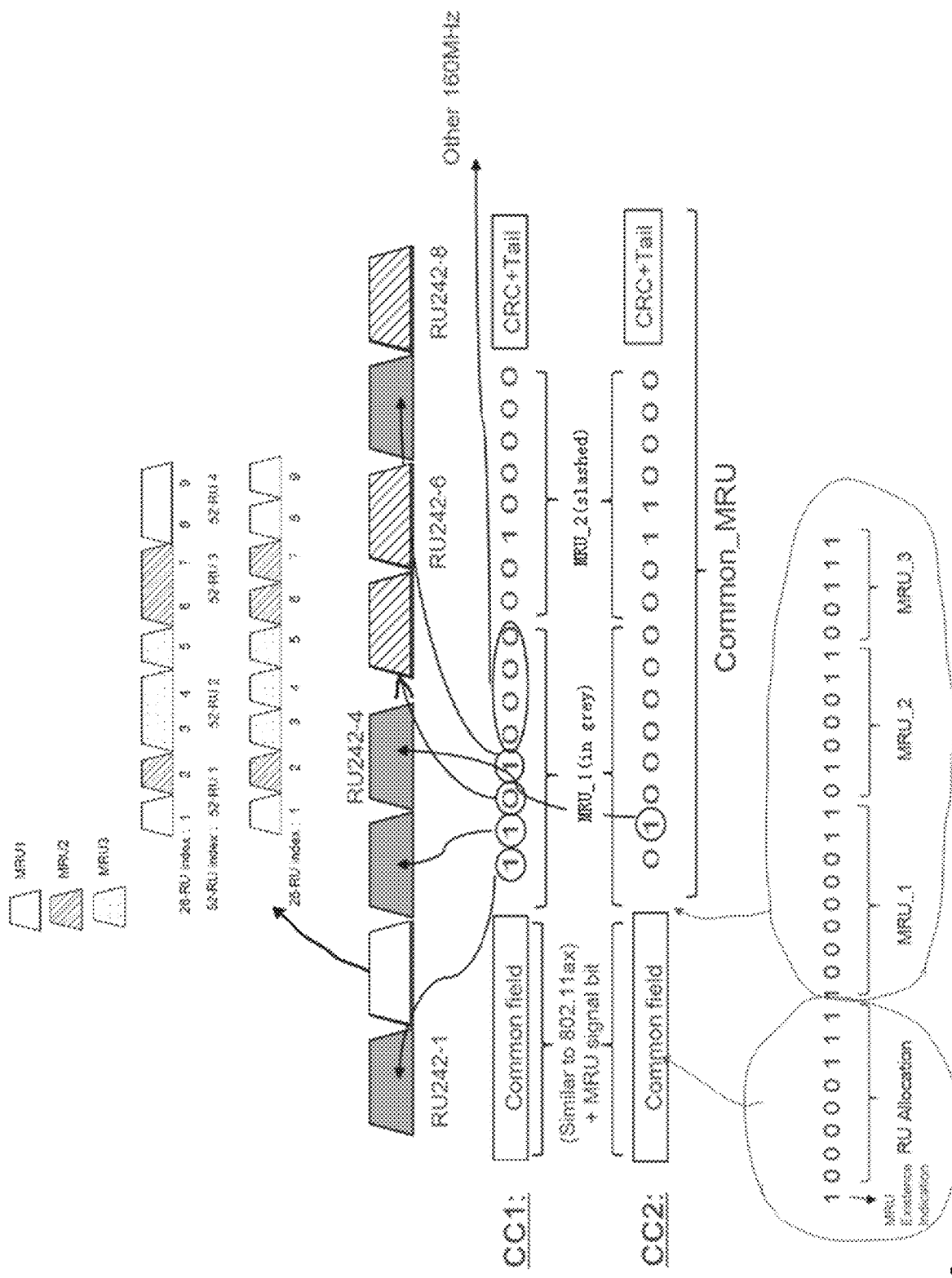
FIG. 19 is a diagram illustrating an example of a transmission contains a mixed type of MRU according to at least one embodiment.

FIG. 19 shows that a transmission contains a mixed type of MRU (large MRU and small MRU) according to at least one embodiment. In FIG. 19, the 242-RU 2 is allocated as the small MRUs such as the FIGS. 17a and 14b, other 242-RUs are allocated in the large MRU, such as FIG. 18.

RA fields (including the RA 2 for the 242-RU 2) are located in the common part of EHT-SIG in similar way as shown in FIG. 18.

The small MRU_1/2/3 field is added at location of MRU field corresponding to RA2 in CC2.

In this embodiment, by providing a Common sub-field with MRU bitmap, many technical advantages are obtained: any combination of MRU is defined, can avoid expanding the RU Allocation subfield, make the implementation practical, and further overall overhead in EHT-SIG is reduced.

Embodiment 4

In this embodiment, MRUs are allowed to be allocated to one station and preamble puncturing is also considered. This embodiment works in the case that allocation of a large RU (RU>484), such as a 996-RU or a 1992-RU (2*996-RU) or a 3984-RU (2*996-RU) where some of the 20 MHz portions included in them are punctured. In this case, the information already available about the channel puncturing is used to define a large punctured RU as a single RU instead of several smaller RUs. This information is available in a field preceding to EHT-SIG which is called "U-SIG", is indicated by 2 or more bits. The common part of EHT-SIG does not include information about puncturing of sub-channels (20 MHZ).

Puncturing is usually occurring (especially in dense networks). Referring to RU>484, the puncturing information is included in a SIG (likely to be defined in U-SIG), the puncturing information is used for defining or indicating a non-contiguous large RU (punctured RU), accordingly a SIG further includes a single user-specific field (in EHT-SIG), in which one or more user fields are included corresponding to the non-contiguous large RU. One or more user fields include different station's information respective. Those stations are thus assigned to the non-contiguous large RU by MU-MIMO.

Figure 20:
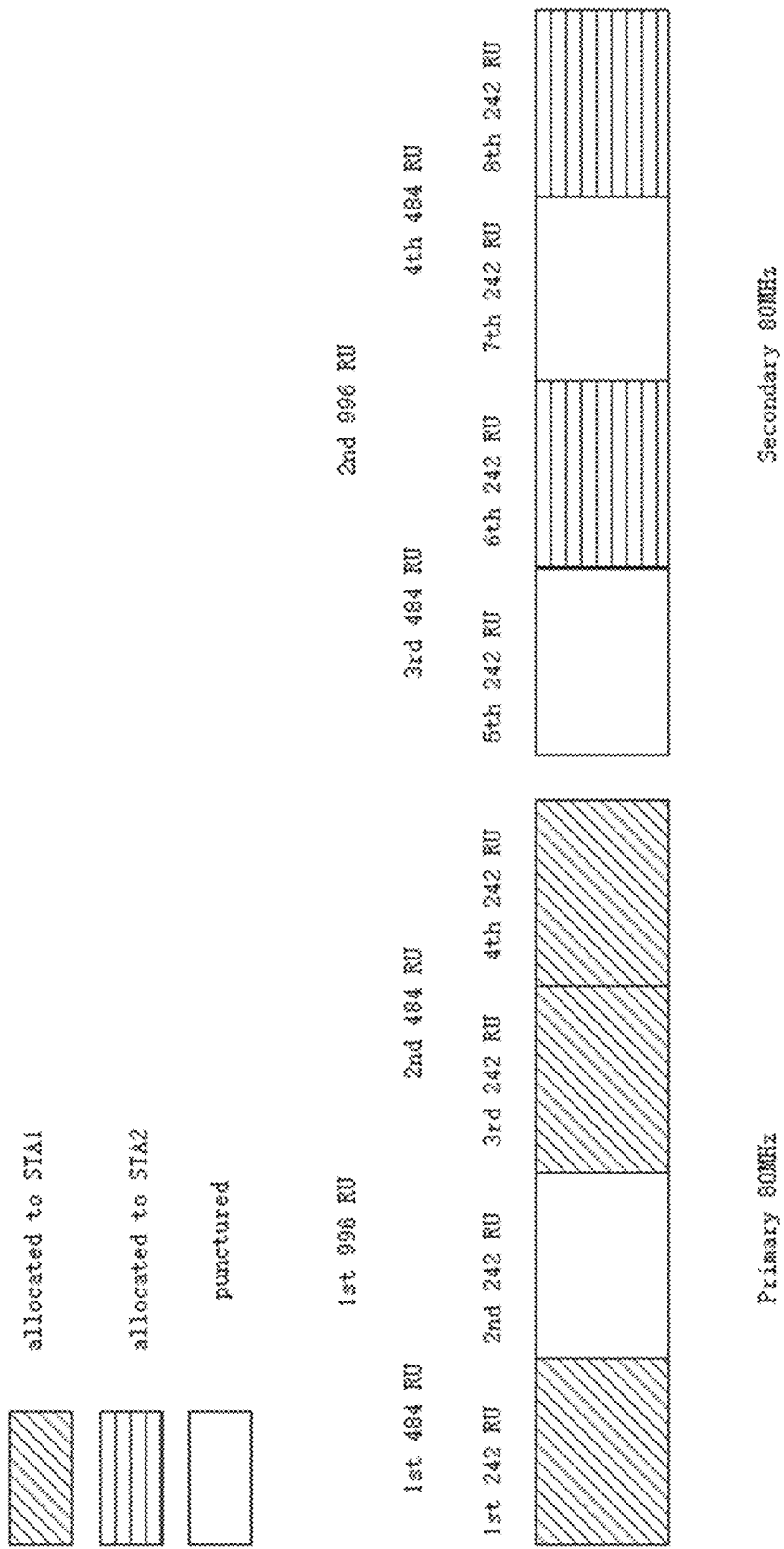
FIG. 20 is a diagram illustrating another example of resource allocation according to at least one embodiment.

FIG. 20 shows use of a bandwidth of 160 MHz according to at least one example. In FIG. 20, a first 996-RU is allocated to STA1, in which the 2nd 242-RU is punctured, wherein the allocations are that the 1st 242-RU and the 2nd 484-RU are allocated to STA1. A second 996-RU is allocated to STA2, in which the 2nd 242-RU is punctured The 6th 242-RU and 8th 242-RU are allocated to the STA2. In the example, the frequency resource allocated to STA1 is defined or considered as one punctured 996-RU (shown as the primary 80 MHZ). A single user specific field (in which different user field with different stations' information) is included corresponding to the punctured 996-RU in an EHT-SIG, instead of the embodiment 1, i.e. two RUs that uses two user fields, in which a first user field corresponds to the 1st 242-RU, a second user field corresponds to the 2nd 484-RU, the first user field and second user field includes same ID of stations. Similarly, the frequency resource allocated to STA2 is also defined or considered as one punctured 996-RU (shown as the secondary 80 MHZ). A single RU is included corresponding to the punctured 996-RU in the EHT-SIG, instead of the embodiment 1, i.e., two RUs require two user fields, in which a first user field corresponds to the 6th 242-RU, a second user field corresponds to the 8th 242-RU.

In response to a STA realizing that RU-996 is assigned, a STA already knows that this RU is punctured.

Reduce overhead

Moreover, any receiver that supports the suggested method (specifically Huawei's device) easily decodes the signals that are defined by the same suggested method, thus disclosing the use by a competitor transmitter.

Embodiment 5

As mentioned in embodiment 3, a new table is defined, in which the newly defined MRU are also indicated by defined index/bit sequences of in the RU Allocation subfield.

The RU Allocation subfield (RA) is 8 bits, 9 bits, 10 bits or more bits, corresponding to a 20 MHz segment. The more the bits are in the RA, the more MRUs is supported, that is, one or more of the above listed MRUs are in an RU allocation and indicated by the index corresponding to the RU allocation. In response to more stations being assigned to a RU or MRU, more bits are used to indicate the number of the stations. In response to the MRU in the RU allocation and number of stations on the MRU being indicated, the mapping between the RU/MRU and the user fields are indicated by the sequence of the RU/MRU and the sequence of the stations/user fields, that is, one to one mapping in order.

As mentioned, the RUs assignment is decided by the AP according to various criterion. Resources of a station used in a transmission is considered in response to determining the RU or MRU.

To reduce the complexity of the table, allocation of RU or MRU are defined in the table, so that an un-efficient allocation of RU/MRU is not allowed.

The following table 4 is an example of the used resources (especially smaller than a 20 MHz) and the RU or MRU based on the used resources.

TABLE 4

| Resources needed at most(number of subcarriers) by a station | preferred RU/MRUs/full bandwidth |
|---|---|
| 1 × 26 | 26-RU |
| 2 × 26 | 52-RU |
| 3 × 26 | adjacent 52 + middle 26 MRU |
| 4 × 26 | 106-RU |
| 5 × 26 | 106 + middle 26 MRU |
| 6 × 26 | 106 + 52 MRU |
| 7 × 26 | 106 + 52 + middle 26 MRU |

TABLE 4-continued

| Resources needed at most(number of subcarriers) by a station | preferred RU/MRUs/full bandwidth |
|---|---|
| 8 × 26 | 106 + 106 MRU |
| 9 × 26 | 242-RU; full bandwidth in a 20 MHz PPDU |

A new indexes table of RU Allocation subfield uses the above RU/MRUs, and number of the MRU, locations of an RU in the MRU is also considered. The more flexible the MRU, the more indexes are used.

The following table 5 is another example of the used resources (especially larger than a 20 MHz, 320 MHz bandwidth is supported), and the RU or MRU based on the used resources which are an entry in the indexes table of RU Allocation subfield.

TABLE 5

| Resources needed at most(number of subcarriers) by a station | preferred RU/MRUs |
|---|---|
| 1 × 242 | 242-RU; full bandwidth in a 20 MHz PPDU |
| 2 × 242 | 484-RU; full bandwidth in a 40 MHz PPDU |
| 3 × 242 | At largest contiguous 3 242-RU (a MRU started by a start 242-RU which the first RA indicating the 3 × 242 correspond to, may be punctured by a second RA corresponding to a 20 MHz following the start 242-RU in frequency) |
| 4 × 242 | At largest contiguous 4 242-RU(996-RU); full bandwidth in a 80 MHz PPDU; |
| 5 × 242 | At largest contiguous 5 242-RU |
| 6 × 242 | At largest contiguous 6 242-RU, may be punctured |
| 7 × 242 | At largest contiguous 7 242-RU |
| 8 × 242 | At largest contiguous 8 242-RU |
| 9 × 242 | At largest contiguous 9 242-RU |
| 10 × 242 | At largest contiguous 10 242-RU |
| 11 × 242 | At largest contiguous 11 242-RU |
| 12 × 242 | At largest contiguous 12 242-RU |
| 13 × 242 | At largest contiguous 13 242-RU |
| 14 × 242 | At largest contiguous 14 242-RU |
| 15 × 242 | At largest contiguous 15 242-RU |
| 16 × 242 | full bandwidth in a 320 MHz PPDU |

The largest contiguous M 242-RU (a large MRU) in the above is defined and mapped to an index, the large MRU starts in frequency domain from a start 242-RU which a beginning RA indicating the Mx242 corresponds (the very first RA in the common part of EHT-SIG indicating the Mx242 MRU), this large MRU is punctured by a second RA corresponding to a 20 MHz following the start 242-RU in frequency domain).

The large MRU is further limited in the following Table 6, which are an entry in the indexes table of RU Allocation subfield:

TABLE 6

| Resources needed at most(number of subcarriers) by a station | preferred RU/MRUs |
|---|---|
| 1 × 242 | 242-RU; full bandwidth in a 20 MHz PPDU |
| 2 × 242 | 484-RU; full bandwidth in a 40 MHz PPDU |

TABLE 6-continued

| Resources needed at most(number of subcarriers) by a station | preferred RU/MRUs |
|---|---|
| 3 × 242 | At largest contiguous 3 242-RU (a MRU started by a start 242-RU which the first RA indicating the 3 × 242 correspond to, may be punctured by a second RA corresponding to a 20 MHz following the start 242-RU in frequency) |
| 4 × 242 | At largest contiguous 4 242-RU(996-RU); full bandwidth in a 80 MHz PPDU; |
| 5 × 242 | At largest contiguous 5 242-RU |
| 6 × 242 | At largest contiguous 6 242-RU, may be puctured |
| 7 × 242 | At largest contiguous 7 242-RU |
| 8 × 242 | At largest contiguous 8 242-RU |

The large MRUs is further reduced.

The entries used for a large MRU is based on the numbers of the stations assigned on the large MRU. For example, in response to 16 stations of MU-MIMO being supported, entry of a large MRU is 16. The values of the indexes are not limited, 2, 3 or 4 bits in the index is used to indicate the number of stations on the large MRU.

Based on the above solution, the examples in the FIG. 6, in the 160 MHZ, the first, third, 4th, 5th 242-RU are assigned to STA1; the 6th, 8th 242-RU are assigned to STA2. The RU allocation is indicated by the common part of EHT-SIG in the following:

the common part of CC1 includes "RA-1, indicating 5×242 MRU (n1)); RA-3, indicating 5×242 MRU (n1); RA-5, indicating 5x242 MRU (n1); RA-7, indicating 242 (n4)";

the common part of CC2 includes "RA-2, indicating 242 (n2); RA-4, indicating 5×242 MRU (n1); RA-6, indicating 3×242 MRU (n3), RA-8, indicating 3×242 MRU (n3)". The n1, n2, n3, n4 is the number of the stations on the large MRU in CC1 or CC2.

In the above mentioned embodiment, a common part of the EHT-SIG is discussed, the user specific field is similar to the solution of the 802.11ax. A sequence of user fields are positioned in the user specific field of a corresponding EHT-SIG, mapping with the RU or MRU in the allocation indicated by the RA field.

In at least one embodiment, besides the MRU indicated by the RA field, other kind of MRU is indicated by the user fields.

Embodiment 6

In at least one embodiment, a signaling method for small RUs is provided where the indication field in the common part of EHT-SIG that includes two fields, the existing RA field and additional signaling of MRU allocation.

This method allows to define any combination of small RUs as MRU while preserving the definition of 20 MHz allocation map of 802.11ax (the RU Allocation subfield).

The indication includes an RA field and additional signaling indicating which RUs that are defined in RA field are allocated as MRU.

For example, to allocate the following map
{26, 26+52, center 26, 26, 26, 52};
where second 26-RU and second 52-RU include an MRU, an RA field of 8 bits '00000101' is first indicated to define the allocation map of {26, 26, 52, center 26, 26, 26, 52}; and then indicate specifically MRU includes the second 26-RU and the second 52-RU.

In this method single user-specific field will be indicated in EHT-SIG per MRU, see single user-specific field specified in the embodiment.

Embodiment 6a

In this embodiment, method is provided for indicating MRU allocation using a bitmap where the bits corresponds to a specific RU which is defined in the RA field.

Every 20 MHz includes up to 4 MRUs thus MRU allocation field will comprise of 4 parts. In at least one embodiment, 1, 2 or 3 MRUs are allowed.

The 1st Part-First MRU is any combination of RUs defined in RA field.

Maximum number of RUs in 20 MHz is 9 thus in order to cover the possible allocations 9 bits are used. The actual number of bits used for MRU allocation will be equal to a number of RUs defined in RA field starting from LSB or MSB of 9 bits. In response to the number of RUs defined in RA field being less than 9, the redundant bits are don't-care bits.

For example, RA field '00000101' defines a RU allocation of
[26, 26, 52, center 26, 26, 26, 52];
And a bitmap of 0 0 1 1 0 0 0 means that second 52-RU and center 26-RU are allocated as MRU while two don't-care bits will be added to the bitmap.

The 2nd Part-Second MRU is any combination of those RUs defined in RA field and not included in the first MRU.

Maximum number of RUs excluding first MRU is 7 thus a bitmap of 7 bits is used. The actual number of bits used for second MRU will be equal to number of RUs defined in RA field minus number of RUs including first MRU starting from LSB or MSB of 7 bits, the redundant bits are don't-care bits.

For example, following the allocation defined in previous section a bitmap of 1 1 0 0 0 means that first and second 26-RU are allocated as MRU while two don't-care bits will be added to the bitmap.

The 3rd Part-Third MRU is any combination of those RUs defined in RA field and not included in first and second MRU.

Maximum number of RUs excluding first and second MRU is 5 thus a bitmap of 5 bits is used. The actual number of bits used for second MRU will be equal to number of RUs defined in RA field minus number of RUs including first and second MRU starting from LSB or MSB of 5 bits, the redundant bits are don't-care bits.

For example, following the allocation defined in previous two sections a bitmap of 0 1 1 means that 7th 26-RU and 4th 52-RU are allocated as MRU The 4th Part-Fourth MRU is any combination of those RUs defined in RA field and not included in first, second and third MRU.

Maximum number of RUs excluding first, second and third MRU is 3 thus a bitmap of 3 bits is used.

In this example, the common field of EHT-SIG includes: one or more RA fields, wherein an RA field is 8 bits and one or more MRU allocation fields, which are 9, 7, 5, 3 bits respectively.

In at least one embodiment, limit modes of MRU are defined. In at least one embodiment, the bits for the RU is allowed to be aggregated to MRU. In response to 26RU-3, 26RU-4, 26RU-5, 26RU-6, 26RU-7 being allowed to be aggregated to an MRU, a first MRU allocation field and a second MRU allocation field occupies 5 bits, 3 bits respectively.

Embodiment 6b

A similar method as in embodiment 6a is described, while the bits of the bitmap of each part defined in embodiment 6a are used to indicate an allocated MRU without using don't-care bits. A bit in the bitmap corresponds a specific 26-RU, while RUs larger than 26 will be indicated by consecutive bits in the bitmap. For example, in order to allocate first 52-RU and last 52-RU as first MRU, a bitmap of '1 1 0 0 0 0 0 1 1' is defined where the first two 1s correspond 1st 52-RU and last two 1s correspond the last 52-RU.

The common field of EHT-SIG includes 8 bits of RA field and 9+7+5+3 bits of MRU allocation field.

Embodiment 6c

A method similar to embodiment 6a and 6b is described while the number of MRUs is indicated in EHT-SIG by a N_MRU field. In response to an N_MRU field being set to zero, no MRU is allocated and a common field of EHT-SIG will include no bitmap. In response to an N_MRU field being set to a number between 1/2/3/4, then 1/2/3/4 MRUs are allocated and a corresponding number of bitmaps will be included as defined in embodiments 6a and 6b.

In this method the common field of EHT-SIG includes one or more RA fields (8 bits) and zero or 9 or 9+7 or 9+7+5 or 9+7+5+3 bits of an MRU allocation field according to the number of MRUs indicated by N_MRU bits.

Embodiment 6d

In at least one embodiment, an additional resource allocation table is defined that includes the defined combinations of MRUs. The additional resource allocation table shows an MRA field-Multiple Resource Allocation field. An entry of MRA in the table defines a map that includes a single MRU or a combination of MRUs. The map defines MRUs while a complete allocation map of 20 MHz is defined by a RA field.

For example, in response to the following map of 20 MHz being allocated [26, 26, 52+center 26, 26, 26, 52];

then RA field of '00000101' indicates the map of [26, 26, 52, center 26, 26, 26, 52];

and a new MRA entry is defined where second 52-RU and center 26-RU are allocated as single MRU.

The new MRA field will not indicate any single RU, but indicates MRUs, thus any RA field entry where 2nd 52-RU and center 26-RU are allocated is combined with MRA field where those RUs are allocated as MRU.

The common part of EHT-SIG includes one or more RA fields (each RA field is 8 bits) and additional N bits of MRA field.

The number of N bits defines a size of MRA table with 2^Nbits options of MRUs map.

Figure 21:
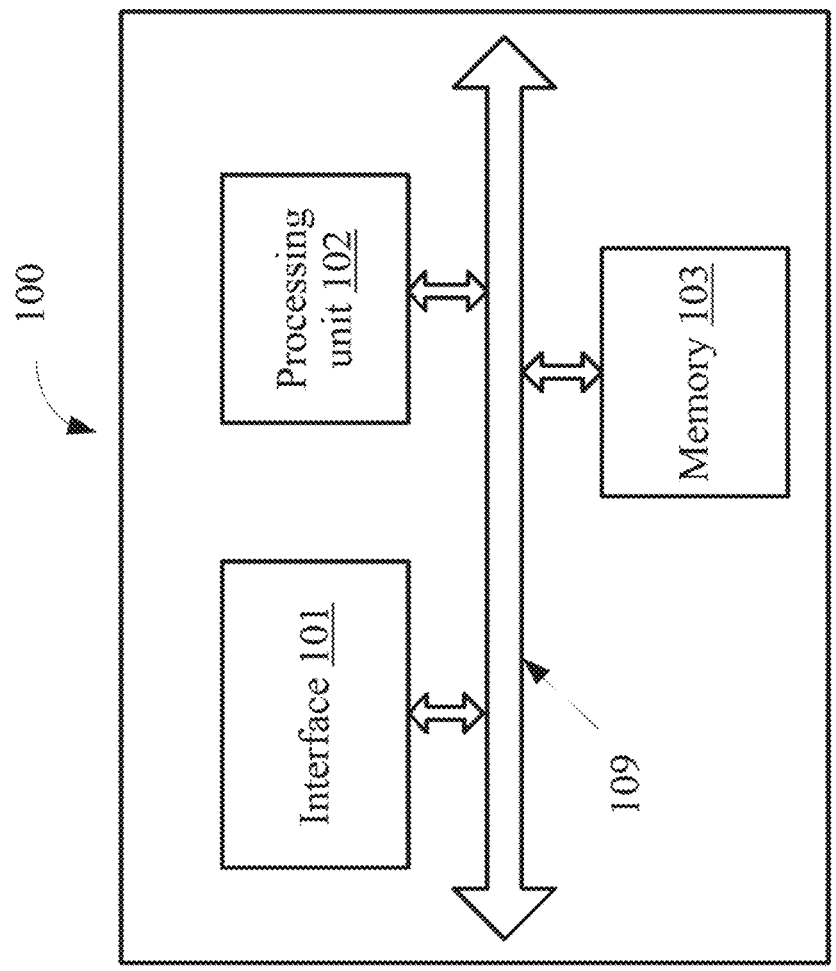
FIG. 21 is a block diagram of an access point according to at least one embodiment.

FIG. 21 is a block diagram of an access point according to at least one embodiment. The access point in FIG. 21 includes an interface 101, a processing unit 102, and a memory 103. The processing unit 102 controls an operation of the access point 100. The memory 103 includes a read-only memory and a random access memory, and provides an instruction and data for the processing unit 102. A part of the memory 103 further includes a nonvolatile random access memory (NVRAM). Components of the access point 100 are coupled together by using a bus system 109, and in addition to a data bus, the bus system 109 further includes a power bus, a control bus, and a status signal bus. However, for clarity of description, various buses are marked as the bus system 109 in FIG. 21.

The methods for sending the foregoing various frames disclosed in the foregoing embodiments is applied to the processing unit 102, or implemented by the processing unit 102. The steps of the foregoing methods are completed by means of an integrated logic circuit of hardware in the processing unit 102 or an instruction in a software form. The processing unit 102 is a general purpose processor, a digital signal processor, an application-specific integrated circuit, a field programmable gate array or another programmable logic device, a discrete gate or a transistor logic device, or a discrete hardware component, and implements or executes various methods, steps, and logic block diagrams disclosed in the embodiments described herein. The general purpose processor is a specially programmed microprocessor, any processor, or the like. The steps of the method disclosed with reference to the embodiments described herein are directly performed by a hardware processor, or are performed by using a combination of hardware in the processor and a software module. The software module is located in a mature storage medium in the field, such as a random access memory, a flash memory, a read-only memory, a programmable read-only memory, an electrically-erasable programmable memory, or a register. The storage medium is located in the memory 103. The processing unit 102 reads information in the memory 103, and completes the steps of the foregoing methods with reference to the hardware of the processing unit 102.

Figure 22:
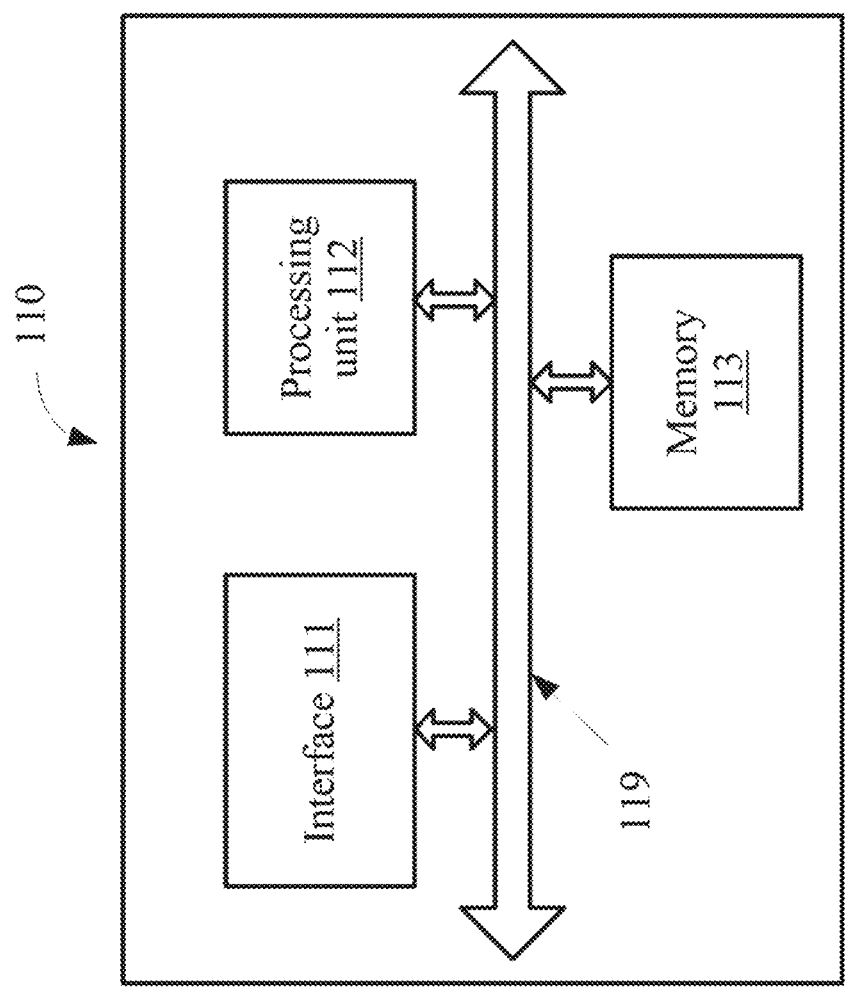
FIG. 22 is a block diagram of a station according to at least one embodiment.

FIG. 22 is a block diagram of a station according to at least one embodiment. The station includes an interface 111, a processing unit 112, and a memory 113. The processing unit 112 controls an operation of the station 110. The memory 113 includes a read-only memory and a random access memory, and provides an instruction and data for the processing unit 112. A part of the memory 113 further includes a nonvolatile random access memory (NVRAM). Components of the station 110 are coupled together by using a bus system 119, and in addition to a data bus, the bus system 119 further includes a power bus, a control bus, and a status signal bus. However, for clarity of description, various buses are marked as the bus system 119 in FIG. 22.

The methods for receiving the foregoing various frames disclosed in the foregoing embodiments are applied to the processing unit 112, or implemented by the processing unit 112. In an at least one embodiment, the steps of the foregoing methods are completed by means of an integrated logic circuit of hardware in the processing unit 112 or an instruction in a software form. The processing unit 112 is a general purpose processor, a digital signal processor, an application-specific integrated circuit, a field programmable gate array or another programmable logic device, a discrete gate or a transistor logic device, or a discrete hardware component, and implements or executes various methods, steps, and logic block diagrams disclosed in embodiments described herein. The general purpose processor is a microprocessor, any processor, or the like. The steps of the method disclosed with reference to the embodiments described herein are directly performed by a hardware processor, or are performed by using a combination of hardware in the processor and a software module. The software module is located in a mature storage medium in the field, such as a random access memory, a flash memory, a read-only memory, a programmable read-only memory, an electrically-erasable programmable memory, or a register. The storage medium is located in the memory 113. The processing unit 112 reads information in the memory 113, and completes the steps of the foregoing methods with reference to the hardware of the processing unit 112.

Specifically, the memory 113 stores received information that enables the processing unit 112 to execute the methods mentioned in the foregoing embodiments.

The detailed description set forth above in connection with the appended drawings describes examples and does not represent the only examples that are contemplated and that are within the scope of the claims. The terms example" and "exemplary, when used in this description, mean "serving as an example, instance, or illustration," and not "preferred" or "advantageous over other examples." The detailed description includes specific details for the purpose of providing an understanding of the described techniques. These techniques, however, are able to be practiced without these specific details. In some instances, well-known structures and apparatuses are shown in block diagram form in order to avoid obscuring the concepts of the described examples.

Information and signals is represented using any of a variety of different technologies and techniques. For example, data, instructions, commands, information, signals, bits, symbols, and chips that are referenced throughout the above description are represented by Voltages, currents, electromagnetic waves, magnetic fields or particles, optical fields or particles, or any combination thereof.

The various illustrative blocks and components described in connection with the disclosure herein is implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor is a microprocessor, but in the alternative, the processor is any processor, controller, microcontroller, or state machine. A processor is also implemented as a combination of computing devices, e.g., a combination of a DSP and a microprocessor, multiple microprocessors, one or more microprocessors in conjunction with a DSP core, or any other such configuration.

The functions described herein is implemented in hardware, software executed by a processor, firmware, or any combination thereof. In response to being implemented in Software executed by a processor, the functions are stored on or transmitted over as one or more instructions or code on a computer-readable medium. Other examples and implementations are within the scope and spirit of the embodiments described herein and the appended claims. For example, due to the nature of software, functions described above are implemented using software executed by a processor, hardware, firmware, hardwiring, or combinations of any of these. Features implementing functions are also physically located at various positions, including being distributed Such that portions of functions are implemented at different physical locations. As used herein, including in the claims, the term "and/or, in response to being used in a list of two or more items, means that any one of the listed items is employed by itself, or any combination of two or more of the listed items is employed. For example, in response to a composition being described as containing components A, B, and/or C, the composition can contain A alone; B alone; C alone; A and B in combination; A and C in combination; B and C in combination; or A, B, and C in combination. Also, as used herein, including in the claims, 'or' as used in a list of items (for example, a list of items prefaced by a phrase such as "at least one of or "one or more of) indicates a disjunctive list such that, for example, a list of "at least one of A, B, or C' means A or B or C or AB or AC or BC or ABC (i.e., A and B and C).

Computer-readable media includes computer storage media and communication media including any medium that facilitates transfer of a computer program from one place to another. A storage medium is any available medium that is accessed by a general purpose or special purpose computer. By way of example, and not limitation, computer-readable media includes RAM, ROM, EEPROM, flash memory, CD-ROM or other optical disk storage, magnetic disk storage or other magnetic storage devices, or any other medium that is used to carry or store desired program code means in the form of instructions or data structures and that is accessed by a general-purpose or special-purpose computer, or a general purpose or special-purpose processor. Also, any connection is properly termed a computer-readable medium. For example, in response to the software being transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies Such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the Scope of computer-readable media.

The previous description provided herein is provided to enable a person skilled in the art to make or use the disclosure. Various modifications to the description will be readily apparent to those skilled in the art, and the generic principles defined herein are applied to other variations without departing from the scope of embodiments described herein. Thus, embodiments described herein are not to be limited to the examples and designs described herein but is to be accorded the broadest scope consistent with the principles and novel features disclosed herein.

In the description herein, "an embodiment" or "an embodiment" mentioned in the specification does not mean that particular features, structures, or characteristics related to the embodiment are included in at least one embodiment. Therefore, "in an embodiment" or "in an embodiment" appearing throughout the specification does not refer to a same embodiment. In addition, these particular features, structures, or characteristics are combined in one or more embodiments by using any appropriate manner. Sequence numbers of the foregoing processes do not mean execution sequences in various embodiments described herein. The execution sequences of the processes are determined according to functions and internal logic of the processes, and are not to be construed as any limitation to the embodiments described herein.

A person of ordinary skill in the art is aware that, in combination with the examples described in the embodiments disclosed in this specification, units and algorithm steps are implemented by electronic hardware, computer software, or a combination thereof. To clearly describe the interchangeability between the hardware and the software, the foregoing has generally described compositions and steps of at least one embodiment according to functions. Whether the functions are performed by hardware or software depends on particular applications and design constraint conditions of the technical solutions. A person skilled in the art is able to use different methods to implement the described functions for embodiments described herein, but the different methods are not to be considered going beyond the scope of embodiments described herein.

A person skilled in the art understands that, for the purpose of convenience and brief description, for a detailed working process of the foregoing system, apparatus, and unit, reference is made to a corresponding process in the foregoing embodiments, and details are not described herein again.

In the several embodiments described herein, the disclosed system, apparatus, and method are implemented in other manners. For example, the described apparatus embodiment is only an example. For example, the unit division is only logical function division and is another division in at least one embodiment. For example, a plurality of units or components are combined or integrated into another system, or some features are ignored or not performed. In addition, the displayed or discussed mutual couplings or direct couplings or communication connections are implemented through some interfaces. The indirect couplings or communication connections between the apparatuses or units are implemented in electronic, mechanical, or other forms.

The units described as separate parts may or may not be physically separate, and parts displayed as units may or may not be physical units, are located in one position, or are distributed on a plurality of network units. A part or all of the units is selected according to actual usage to achieve the objectives of the solutions of at least one embodiment.

In addition, functional units in the embodiments described herein are integrated into one processing unit, or the units exist alone physically, or two or more units are integrated into one unit. The integrated unit is implemented in a form of hardware, or is implemented in a form of a software functional unit.

What is claimed is:

1. An apparatus for wireless communication, comprising:
   a memory that stores instructions; and
   a processor coupled with the memory, wherein the processor is configured to execute the instructions in the memory to cause the processor to:
     generate a signaling field, SIG, in a wireless local area network, WLAN, the SIG includes a resource unit, RU, allocation field indicating a size and location of an RU in a frequency resource, the SIG further includes one or more user fields, wherein a user field includes information of a scheduled station, STA; wherein an MRU which includes multiple RUs is assigned to a same one or more STAs; and the SIG comprises a Single-RU user field and a MRU user field; the Single-RU user field corresponds to a RU which is not a MRU; a MRU user field corresponds to a MRU, comprising at least the following: a STA identifier, STA ID; and a RU allocation information indicating size and location of each RU comprised in the MRU;
     transmit the SIG.

2. The apparatus according to claim 1, wherein the MRU is a small MRU, which includes combination of 26-RU, 52-RU, or 106-RU in a 20 MHz frequency segment; or the MRU is a large MRU which includes combination of 242-RU, 484-RU, or 996-RU in a transmission bandwidth.

3. The apparatus according to claim 1, wherein the MRU includes a first RU and a second RU, and the SIG includes a first user field corresponding to the first RU and a second user field corresponding to the second RU, the first user field and the second user field including a same ID of the STA.

4. The apparatus according to claim 3, the second user field further includes one or any combination of the following:
   the number of RUs assigned to the STA; and
   the size and location of an RU in the MRU assigned to the STA.

5. The apparatus according to claim 1, wherein a common field of the SIG includes at least one of information for small MRU allocated in a corresponding 20 MHz frequency segment, and information for a number of a large MRU allocated in a bandwidth of the transmission.

6. The apparatus according to claim 1, wherein the SIG includes a Common-MRU field indicating at least one of which 26-RUs are included in an MRU in a corresponding 20 MHz frequency segment, and which 242-RUs are included in an MRU in a bandwidth of the transmission.

7. The apparatus according to claim 1, wherein the SIG includes one or more Common-MRU fields, a Common-MRU field indicating which actual allocated RUs are in an MRU.

8. The apparatus according to claim 1, wherein the SIG includes puncturing information, indicating a non-contiguous large RU and one or more user-fields corresponding to the non-contiguous large RU, the one or more user-fields include a different station's information.

9. A method for wireless communication, comprising:
   generating a signaling field, SIG, in a wireless local area network, WLAN, the SIG including a resource unit, RU, and an allocation field indicating a size and location of an RU in a frequency resource, the SIG further including one or more user fields, a user field including information of a scheduled station, STA; wherein a MRU which includes multiple RUs is assigned to a same one or more STAs; and the SIG comprises a Single-RU user field and a MRU user field; the Single-RU user field corresponds to a RU which is not a MRU; a MRU user field corresponds to a MRU, comprising at least the following: a STA identifier, STA_ID; and a RU c comprised in the MRU;
   transmitting the SIG.

10. The method according to claim 9, wherein the MRU is a small MRU which includes combination of 26-RU, 52-RU, or 106-RU in a 20 MHz frequency segment, and the MRU is a large MRU which includes combination of 242-RU, 484-RU, or 996-RU in a transmission bandwidth.

11. The method according to claim 9, wherein the MRU includes a first RU and a second RU, an EHT-SIG includes a first user field corresponding to the first RU and a second user field corresponding to the second RU, wherein the first user field and the second user field including a same ID of the STA.

12. The method according to claim 11, the second user field further includes at least one of:
   the number of RUs assigned to the STA; and
   the size and location of an RU in the MRU assigned to the STA.

13. The method according to claim 9, a common field of the SIG includes at least one of information for small MRU allocated in a corresponding 20 MHz frequency segment, and information for a number of the large MRU allocated in a bandwidth of the transmission.

14. The method according to claim 9, the SIG includes a Common-MRU field indicating which 26-RUs are included in an MRU in a corresponding 20 MHz frequency segment, and indicating which 242-RUs are included in an MRU in a bandwidth of the transmission.

15. The method according to claim 9, the SIG includes one or more Common-MRU fields, a Common-MRU field indicating which actual allocated RUs are in an MRU.

16. The method according to claim 9, the SIG includes puncturing information, indicating a non-contiguous large RU and one or more user-fields corresponding to the non-contiguous large RU, the one or more user-fields including a different station's information.

17. A non-transitory computer readable medium configured to store instructions thereon, wherein the instructions, when executed by a processor, cause the processor to:

generate a signaling field, SIG, in a wireless local area network, WLAN, the SIG includes a resource unit, RU, allocation field indicating a size and location of an RU in a frequency resource, the SIG further includes one or more user fields, wherein a user field includes information of a scheduled station, STA; wherein an MRU which includes multiple RUs is assigned to a same one or more STAs; and the SIG comprises a Single-RU user field and a MRU user field; the Single-RU user field corresponds to a RU which is not a MRU; a MRU user field corresponds to a MRU, comprising at least the following: a STA identifier, STA ID; and a RU allocation information indicating size and location of each RU comprised in the MRU;

transmit the SIG.

18. The non-transitory computer readable medium according to claim 17, wherein the MRU is a small MRU, which includes combination of 26-RU, 52-RU, or 106-RU in a 20 MHz frequency segment; or the MRU is a large MRU which includes combination of 242-RU, 484-RU, or 996-RU in a transmission bandwidth.

* * * * *